United States Patent
Baker et al.

(10) Patent No.: US 9,856,769 B2
(45) Date of Patent: Jan. 2, 2018

(54) GAS SEPARATION PROCESS USING MEMBRANES WITH PERMEATE SWEEP TO REMOVE $CO_2$ FROM COMBUSTION EXHAUST

(71) Applicant: Membrane Technology and Research, Inc., Newark, CA (US)

(72) Inventors: Richard W Baker, Palo Alto, CA (US); Timothy C Merkel, San Jose, CA (US); Johannes G Wijmans, Menlo Park, CA (US)

(73) Assignee: Membrane Technology and Research, inc., Newark, CA (US)

( * ) Notice: Subject to any disclaimer, the term of this patent is extended or adjusted under 35 U.S.C. 154(b) by 0 days.

(21) Appl. No.: 15/446,443

(22) Filed: Mar. 1, 2017

(65) Prior Publication Data

US 2017/0183996 A1   Jun. 29, 2017

Related U.S. Application Data

(60) Continuation-in-part of application No. 15/066,771, filed on Mar. 10, 2016, which is a division of
(Continued)

(51) Int. Cl.
*B01D 53/22* (2006.01)
*F01N 3/08* (2006.01)
(Continued)

(52) U.S. Cl.
CPC ....... *F01N 3/0857* (2013.01); *B01D 53/1475* (2013.01); *B01D 53/1493* (2013.01);
(Continued)

(58) Field of Classification Search
CPC .. F01N 3/0857; F01N 3/0205; F01N 2570/10; B01D 2252/20484;
(Continued)

(56) References Cited

U.S. PATENT DOCUMENTS

| 990,168 A | 4/1911 | Scott |
| 1,783,901 A | 12/1930 | Bottoms |

(Continued)

FOREIGN PATENT DOCUMENTS

| CN | 102795956 A | 11/2012 |
| EP | 2505573 A1 | 10/2012 |
| WO | WO2009139835 A1 | 11/2009 |

OTHER PUBLICATIONS

US 4,981,498, 01/1991, Bikson et al. (withdrawn)
(Continued)

*Primary Examiner* — Anthony Shumate
(74) *Attorney, Agent, or Firm* — Timothy A. Hott

(57) ABSTRACT

A gas separation process for treating exhaust gases from combustion processes. The invention involves routing a first portion of the exhaust stream to a carbon dioxide capture step, while simultaneously flowing a second portion of the exhaust gas stream across the feed side of a membrane, flowing a sweep gas stream, usually air, across the permeate side, then passing the permeate/sweep gas back to the combustor.

22 Claims, 8 Drawing Sheets

Related U.S. Application Data application No. 13/548,827, filed on Jul. 13, 2012, now Pat. No. 9,457,313, which is a continuation-in-part of application No. 13/115,726, filed on May 25, 2011, now Pat. No. 8,220,248, which is a continuation-in-part of application No. 13/122,136, filed as application No. PCT/US2010/002480 on Sep. 13, 2010, now Pat. No. 8,177,885, said application No. 13/548,827 is a continuation-in-part of application No. 13/122,136, filed as application No. PCT/US2010/002480 on Sep. 13, 2010, now Pat. No. 8,177,885.

(51) Int. Cl.
 B01D 53/14 (2006.01)
 F01N 3/02 (2006.01)
(52) U.S. Cl.
 CPC ......... *B01D 53/229* (2013.01); *F01N 3/0205* (2013.01); *B01D 2252/20405* (2013.01); *B01D 2252/20421* (2013.01); *B01D 2252/20484* (2013.01); *F01N 2570/10* (2013.01)
(58) Field of Classification Search
 CPC ........... B01D 2252/20421; B01D 2252/20405; B01D 53/229; B01D 53/1493; B01D 53/1475; B01D 2257/504
 See application file for complete search history.

(56) References Cited

U.S. PATENT DOCUMENTS

| | | | |
|---|---|---|---|
| 2,651,176 | A | 9/1953 | Yellott |
| 3,651,640 | A | 3/1972 | Nicita |
| 4,350,511 | A | 9/1982 | Holmes et al. |
| 4,371,381 | A | 2/1983 | Schuftan |
| 4,376,102 | A | 3/1983 | Thaler et al. |
| 4,462,814 | A | 7/1984 | Holmes et al. |
| 4,639,257 | A | 1/1987 | Duckett et al. |
| 4,659,343 | A | 4/1987 | Kelly |
| 4,761,164 | A | 8/1988 | Pez et al. |
| 4,781,907 | A | 11/1988 | McNeill |
| 4,834,779 | A | 5/1989 | Paganessi et al. |
| 4,843,206 | A | 6/1989 | Azuma et al. |
| 4,923,493 | A | 5/1990 | Valencia et al. |
| 4,931,070 | A | 5/1990 | Prasad |
| 4,936,887 | A | 6/1990 | Waldo et al. |
| 4,963,165 | A | 10/1990 | Blume et al. |
| 4,990,168 | A | 2/1991 | Sauer et al. |
| 5,034,126 | A | 7/1991 | Reddy et al. |
| 5,233,837 | A | 8/1993 | Callahan |
| 5,240,471 | A | 8/1993 | Barbe et al. |
| 5,256,295 | A | 10/1993 | Baker et al. |
| 5,430,218 | A | 7/1995 | Miller et al. |
| 5,452,581 | A | 9/1995 | Dinh et al. |
| 5,500,036 | A | 3/1996 | Kalthod |
| 5,516,961 | A | 5/1996 | Miller et al. |
| 5,641,337 | A | 6/1997 | Arrowsmith et al. |
| 5,675,052 | A | 10/1997 | Menon et al. |
| 5,681,433 | A | 10/1997 | Friesen et al. |
| 5,724,805 | A | 3/1998 | Golomb et al. |
| 5,769,927 | A | 6/1998 | Gottschlich et al. |
| 5,779,763 | A | 7/1998 | Pinnau et al. |
| 5,843,209 | A | 12/1998 | Ray et al. |
| 5,979,178 | A | 11/1999 | Engler et al. |
| 5,980,609 | A | 11/1999 | Baker et al. |
| 6,085,549 | A | 7/2000 | Daus et al. |
| 6,139,604 | A | 10/2000 | Gottzmann et al. |
| 6,228,145 | B1 | 5/2001 | Falk-Pedersen et al. |
| 6,298,664 | B1 | 9/2001 | Åsen et al. |
| 6,478,852 | B1 | 11/2002 | Callaghan et al. |
| 6,572,837 | B1 | 6/2003 | Holland et al. |
| 6,648,944 | B1 | 11/2003 | Baker et al. |
| 6,695,983 | B2 | 2/2004 | Prasad et al. |
| 6,702,570 | B2 | 3/2004 | Shah et al. |
| 6,723,231 | B1 | 4/2004 | Geus et al. |
| 6,821,501 | B2 | 11/2004 | Matzakos et al. |
| 6,951,111 | B2 | 10/2005 | Chen |
| 7,329,306 | B1 | 2/2008 | Koch |
| 7,405,338 | B2 | 7/2008 | Brophy et al. |
| 7,625,427 | B2 | 12/2009 | Clarke et al. |
| 7,713,332 | B2 | 5/2010 | Bronold |
| 7,763,097 | B2 | 7/2010 | Federspiel et al. |
| 7,909,911 | B2 | 3/2011 | Kackner et al. |
| 7,964,020 | B2 | 6/2011 | Baker et al. |
| 7,966,829 | B2 | 6/2011 | Finkenrath et al. |
| 7,981,196 | B2 | 7/2011 | Kang et al. |
| 8,016,923 | B2 | 9/2011 | Baker et al. |
| 8,025,715 | B2 | 9/2011 | Wijmans et al. |
| 8,034,168 | B2 | 10/2011 | Wijmans et al. |
| 8,104,259 | B2 | 1/2012 | Joshi et al. |
| 8,163,065 | B2 | 4/2012 | Lackner et al. |
| 8,177,885 | B2 | 5/2012 | Wijmans et al. |
| 8,202,349 | B2 * | 6/2012 | Molaison ............... B01D 63/02 48/128 |
| 8,220,247 | B2 | 7/2012 | Wijmans et al. |
| 8,220,248 | B2 | 7/2012 | Wijmans et al. |
| 8,246,718 | B2 | 8/2012 | Wijmans et al. |
| 8,669,294 | B2 | 3/2014 | Lien et al. |
| 8,734,569 | B2 | 5/2014 | Hasse et al. |
| 8,829,059 | B2 | 9/2014 | Wynn |
| 8,852,319 | B2 | 10/2014 | Wijmans et al. |
| 8,869,890 | B2 | 10/2014 | Chinn et al. |
| 9,140,186 | B2 | 9/2015 | Wei et al. |
| 9,146,035 | B2 | 9/2015 | Boulet |
| 2003/0068260 | A1 | 4/2003 | Wellington et al. |
| 2003/0131582 | A1 | 7/2003 | Anderson et al. |
| 2005/0011353 | A1 | 1/2005 | Shirley |
| 2005/0028529 | A1 | 2/2005 | Bartlett et al. |
| 2005/0053878 | A1 | 3/2005 | Bruun et al. |
| 2005/0238563 | A1 | 10/2005 | Eighmy et al. |
| 2007/0017367 | A1* | 1/2007 | McElroy ............ B01D 53/053 95/90 |
| 2007/0017368 | A1* | 1/2007 | Levan ............... H01M 8/04089 95/96 |
| 2007/0248527 | A1 | 10/2007 | Spencer |
| 2007/0277674 | A1* | 12/2007 | Hirano ................. B01D 53/002 95/290 |
| 2008/0011161 | A1 | 1/2008 | Finkenrath et al. |
| 2008/0104958 | A1* | 5/2008 | Finkenrath .............. B01D 53/00 60/605.2 |
| 2008/0127632 | A1 | 6/2008 | Finkenrath et al. |
| 2008/0176174 | A1 | 7/2008 | White et al. |
| 2008/0236117 | A1* | 10/2008 | Zhang ................... B01D 53/62 55/418 |
| 2008/0309087 | A1 | 12/2008 | Evulet et al. |
| 2009/0162922 | A1 | 6/2009 | De Mattia et al. |
| 2009/0232861 | A1 | 9/2009 | Wright et al. |
| 2009/0257941 | A1 | 10/2009 | Rudberg et al. |
| 2010/0037772 | A1 | 2/2010 | Roe et al. |
| 2010/0126180 | A1 | 5/2010 | Forsyth et al. |
| 2010/0180565 | A1 | 7/2010 | Draper |
| 2010/0205960 | A1 | 8/2010 | McBride et al. |
| 2010/0236404 | A1 | 9/2010 | Baker et al. |
| 2010/0251887 | A1 | 10/2010 | Jain |
| 2010/0260657 | A1 | 10/2010 | Niitsuma et al. |
| 2010/0294131 | A1* | 11/2010 | Bade ..................... B01D 53/50 95/223 |
| 2010/0300114 | A1 | 12/2010 | Mhadeshwar et al. |
| 2010/0319354 | A1* | 12/2010 | Guidati .................. F01K 23/10 60/772 |
| 2011/0005272 | A1 | 1/2011 | Wijmans et al. |
| 2011/0167821 | A1 | 7/2011 | Baker et al. |
| 2011/0195473 | A1 | 8/2011 | Wilhelm |
| 2011/0200491 | A1 | 8/2011 | Wijmans et al. |
| 2011/0219777 | A1 | 9/2011 | Wijmans et al. |
| 2011/0219778 | A1 | 9/2011 | Wijmans et al. |
| 2011/0219949 | A1 | 9/2011 | Wijmans et al. |
| 2011/0239700 | A1 | 10/2011 | Hasse et al. |
| 2011/0260112 | A1 | 10/2011 | Wijmans et al. |
| 2011/0262328 | A1 | 10/2011 | Wijmans et al. |
| 2012/0031101 | A1 | 2/2012 | Hoffmann et al. |

(56) References Cited

U.S. PATENT DOCUMENTS

| | | |
|---|---|---|
| 2012/0042810 A1 | 2/2012 | Niass |
| 2012/0055385 A1 | 3/2012 | Lien et al. |
| 2012/0078024 A1 | 3/2012 | Butler et al. |
| 2012/0111192 A1* | 5/2012 | Nazarko ............ B01D 53/1475 95/51 |
| 2012/0118010 A1* | 5/2012 | Forsyth ................ B01D 53/002 62/617 |
| 2012/0118011 A1 | 5/2012 | Terrien et al. |
| 2012/0131925 A1 | 5/2012 | Mittricker et al. |
| 2012/0190904 A1 | 7/2012 | Butler |
| 2012/0272657 A1 | 11/2012 | Baker et al. |
| 2013/0058853 A1 | 3/2013 | Baker et al. |
| 2013/0086917 A1 | 4/2013 | Slobodyanskiy et al. |
| 2013/0104525 A1 | 5/2013 | Allam et al. |
| 2013/0125554 A1 | 5/2013 | Mittricker et al. |
| 2013/0131199 A1 | 5/2013 | Lien et al. |
| 2013/0200625 A1 | 8/2013 | Wei et al. |
| 2013/0213049 A1 | 8/2013 | Allam et al. |
| 2013/0244190 A1 | 9/2013 | Marumoto et al. |
| 2013/0283808 A1 | 10/2013 | Kolvick |
| 2014/0366549 A1 | 12/2014 | Wang et al. |
| 2014/0366724 A1 | 12/2014 | Wijmans et al. |
| 2014/0374109 A1 | 12/2014 | Denton et al. |
| 2015/0013300 A1 | 1/2015 | Axelbaum et al. |
| 2015/0362188 A1 | 12/2015 | Wojak |
| 2016/0102859 A1 | 4/2016 | Fisher |
| 2016/0256819 A1 | 9/2016 | Kulkarni |

OTHER PUBLICATIONS

A. Kohl and R. Nielsen, Gas Purification, fifth edition, Gulf Publishing Co, Houston TX, 1997, pp. 1188-1237.

K. O'Brien et al. "Fabrication and Scale-Up of PBI-based Membrane System for Pre-Combustion Capture of Carbon Dioxide," DOE NETL Project Fact Sheet, 2009.

B. T. Low et al., "Simultaneous Occurrence of Chemical Grafting, Cross-linking, and Etching on the Surface of Polyimide Membranes and Their Impact on H2/CO2 Separation," Macromolecules, vol. 41, No. 4, pp. 1297-1309, 2008.

Lin et al., "Materials selection guidelines for membranes that remove CO2 from gas mixtures," J. Mol. Struct., 739, 57-75, 2005.

Lin et al., "Plastization-Enhanced Hydrogen Purification Using Polymeric Membranes," Science, 311, 639-642, 2006.

M. Anderson and Y.S. Lin, "Carbonate-ceramic dual-phase membrane for carbon dioxide separation", Journal of Membrane Science, vol. 357(1-2), pp. 122-129 (2010).

J. Lou and W.S. Ho, "CO2-selective polymeric membranes containing amines in crosslinked poly(vinyl alcohol)", Journal of Membrane Science, vol. 286, pp. 310-321 (2006).

* cited by examiner (not in accordance with invention)

(not in accordance with invention)

(not in accordance with invention)

(not in accordance with invention)

GAS SEPARATION PROCESS USING MEMBRANES WITH PERMEATE SWEEP TO REMOVE CO₂ FROM COMBUSTION EXHAUST

CROSS-REFERENCE TO RELATED APPLICATIONS

This application is a continuation-in-part and claims the benefit of U.S. application Ser. No. 15/066,771, filed Mar. 10, 2016, which is a divisional of U.S. application Ser. No. 13/548,827, filed Jul. 13, 2012, which issued Oct. 4, 2016 as U.S. Pat. No. 9,457,313; which is a continuation-in-part and claims the benefit of both (1) U.S. application Ser. No. 13/115,726, filed May 25, 2011, which issued Jul. 17, 2012 as U.S. Pat. No. 8,220,248; which is a continuation-in-part and claims the benefit of U.S. application Ser. No. 13/122,136, filed Mar. 31, 2011, which issued May 15, 2012 as U.S. Pat. No. 8,177,885; which is a national stage application of, and claims the benefit of, PCT Application No. PCT/US10/02480, filed Sep. 13, 2010; and (2) U.S. application Ser. No. 13/122,136, filed Mar. 31, 2011, which issued May 15, 2012 as U.S. Pat. No. 8,177,885; which is a national stage application of, and claims the benefit of, PCT Application No. PCT/US10/02480, filed Sep. 13, 2010; the entire contents of all of which applications are hereby incorporated by reference.

FIELD OF THE INVENTION

The invention relates to membrane-based gas separation processes, and specifically to processes using a sweep gas on the permeate side of the membranes to remove carbon dioxide from combustion exhaust gases.

BACKGROUND OF THE INVENTION

Many combustion processes produce flue gases contaminated with carbon dioxide that contribute to global warming and environmental damage. Such gas streams are difficult to treat in ways that are both technically and economically practical, and there remains a need for better treatment techniques.

Gas separation by means of membranes is a well-established technology. In an industrial setting, a total pressure difference is usually applied between the feed and permeate sides, typically by compressing the feed stream or maintaining the permeate side of the membrane under partial vacuum.

It is known in the literature that a driving force for transmembrane permeation may be supplied by passing a sweep gas across the permeate side of the membranes, thereby lowering the partial pressure of a desired permeant on that side to a level below its partial pressure on the feed side. In this case, the total pressure on both sides of the membrane may be the same, the total pressure on the permeate side may be higher than on the feed side, or there may be additional driving force provided by keeping the total feed pressure higher than the total permeate pressure.

Using a sweep gas has most commonly been proposed in connection with air separation to make nitrogen or oxygen-enriched air, or with dehydration. Examples of patents that teach the use of a sweep gas on the permeate side to facilitate air separation include U.S. Pat. Nos. 5,240,471; 5,500,036; and 6,478,852. Examples of patents that teach the use of a sweep gas in a dehydration process include U.S. Pat. Nos. 4,931,070; 4,981,498 and 5,641,337.

Configuring the flow path within the membrane module so that the feed gas and sweep stream flow, as far as possible, countercurrent to each other is also known, and taught, for example in U.S. Pat. Nos. 5,681,433 and 5,843,209.

The use of a process including a membrane separation step operated in sweep mode for treating flue gas to remove carbon dioxide is taught in co-owned U.S. Pat. No. 7,964,020.

SUMMARY OF THE INVENTION

The invention is a process involving membrane-based gas separation for controlling carbon dioxide emissions from combustion processes in which carbon dioxide emissions are so controlled.

Combustion exhaust streams or off-gases are typically referred to as flue gas, and arise in large quantities from different types of combustion apparatuses, including ovens, furnaces, boilers, gas turbines, and gas-powered or diesel-powered engines. In particular, power plants generate enormous amounts of flue gas. For example, a modestly sized 100 megawatt power plant may produce over 300 MMscfd of flue gas.

The major components of combustion exhaust gases are normally nitrogen, carbon dioxide, and water vapor. Other components that may be present, typically only in small amounts, include oxygen, hydrogen, $SO_x$, $NO_x$, and unburnt hydrocarbons. Syngas may also contain heavy metals, such as mercury. The carbon dioxide concentration in the flue gas is generally up to about 20 vol %.

In addition to gaseous components, combustion flue gas—depending on the fuel used—may contain suspended particulate matter in the form of fly ash and soot. This material is usually removed by several stages of filtration before the gas is sent to the stack. It is assumed herein that the flue gas has already been treated in this way, if desired, prior to carrying out the processes of the invention.

The process of the invention involves treating the exhaust or flue gas to remove carbon dioxide. In preferred embodiments, the carbon dioxide level of the exhaust gas is reduced to as low as 5 vol % or less. Discharge of such a stream to the environment is much less damaging than discharge of the untreated exhaust.

The combustion process from which the exhaust is drawn may be of any type. The fuel may be a fossil fuel, such as coal, oil or natural gas, or may be from any other source, including but not limited to syngas, refinery fuel gas, blast furnace off-gas, landfill gas, biomass, or other combustible waste. The fuel may be combusted by mixing with air, oxygen-enriched air, or pure oxygen. For processes that combust methane-containing gases, it is often a requirement that the gas being burnt should be mixed with a diluent gas to control the flame temperature of the combustor. Typically, the diluent is excess air, steam, or nitrogen, or it may be provided by partial recycling of the flue gas exhaust. In natural gas combustion, the volume of diluent may be equal or greater than the volume of air required for stoichiometric combustion of the gas.

After the combustion step itself, a first portion of the flue gas is subjected to a carbon dioxide capture step. This capture step removes a portion of the carbon dioxide from the emissions stream, and preferably provides it in the form of a concentrated stream, such as greater than 60, 70, or 80 vol % carbon dioxide, and most preferably as a supercritical fluid or liquid high purity product. The concentrated product stream may be sent for sequestration, or for any other use.

The capture step may utilize any separation technology suitable for recovering carbon dioxide from a stream of the exhaust gas concentration. Preferred technologies are absorption, such as amine scrubbing or chilled ammonia sorption, membrane separation, and condensation.

The off-gas stream from the capture step still contains carbon dioxide, but normally at a lower concentration than the raw exhaust stream. Typically, this concentration will be less than half that of the feed.

A second portion of the flue gas is sent for treatment in a sweep-based membrane separation unit. The unit contains membranes selectively permeable to carbon dioxide over nitrogen, and to carbon dioxide over oxygen. It is preferred that the membrane provide a carbon dioxide permeance of at least about 300 gpu, more preferably at least about 500 gpu, and most preferably at least about 1,000 gpu under the operating conditions of the process. A carbon dioxide/nitrogen selectivity of at least about 10, or more preferably 20, under the operating conditions of the process is also desirable.

The off-gas flows across the feed side of the membranes, and a sweep gas of air, oxygen-enriched air, or oxygen flows across the permeate side, to provide or augment the driving force for transmembrane permeation.

The sweep stream picks up the preferentially permeating carbon dioxide. The combined sweep/permeate stream is then withdrawn from the membrane unit and is returned to the combustor to form at least part of the air, oxygen-enriched air, or oxygen feed to the combustion step.

By using the oxygen-containing stream destined for the combustor as sweep gas, the membrane separation step is carried out in a very efficient manner, and without introducing any additional unwanted components into the combustion zone.

The process is particularly useful in applications that are energy-sensitive, as is almost always the case when the very large streams from power plants and the like are to be processed.

The process is also particularly useful in separations that are pressure-ratio limited, as will be explained in more detail below.

The membrane separation step may be carried out using one or more individual membrane modules. Any modules capable of operating under permeate sweep conditions may be used. Preferably, the modules take the form of hollow-fiber modules, plate-and-frame modules, or spiral-wound modules. All three module types are known, and their configuration and operation in sweep, including counterflow sweep modes, is described in the literature.

The process may use one membrane module, but in most cases, the separation will use multiple membrane modules arranged in series or parallel flow arrangements as is well known in the art. Any number of membrane modules may be used.

The process may be augmented by operating the membrane unit with higher total pressure on the feed side than on the permeate side, thereby increasing the transmembrane driving force for permeation.

It is highly preferred that the feed gas flow direction across the membrane on the feed side and the sweep gas flow direction across the membrane on the permeate side are substantially countercurrent to each other. In the alternative, the relative flow directions may be substantially crosscurrent, or less preferred, cocurrent.

The residue stream is reduced in carbon dioxide content to less than about 5 vol %. This stream is typically, although not necessarily, discharged to the environment. The substantial reduction of the carbon dioxide content in the raw exhaust greatly reduces the environmental impact of discharging the stream.

The invention, in a basic embodiment, includes three steps: a combustion step, a carbon dioxide capture step, and a sweep-based membrane separation step, where the carbon dioxide capture step and the sweep-based membrane separation step are performed in parallel. That is, a portion of the exhaust stream from the combustion process is routed to a carbon dioxide capture step, and the other portion is routed to a sweep-based membrane separation step. Thus, in one embodiment, the process of the invention comprises the following steps:

(a) performing a combustion process by combusting a mixture comprising a gaseous fuel and air, oxygen-enriched air, or oxygen, thereby creating an exhaust stream comprising carbon dioxide and nitrogen;
(b) performing a carbon dioxide capture step to remove a portion of carbon dioxide in concentrated form from a first portion of the exhaust stream;
(c) providing a membrane having a feed side and a permeate side, and being selectively permeable to carbon dioxide over nitrogen and to carbon dioxide over oxygen;
(d) passing a second portion of the exhaust stream across the feed side;
(e) passing air, oxygen-enriched air, or oxygen as a sweep stream across the permeate side;
(f) withdrawing from the feed side a carbon dioxide-depleted vent stream;
(g) withdrawing from the permeate side a permeate stream comprising oxygen and carbon dioxide;
(h) passing the permeate stream to step (a) as at least part of the air, oxygen-enriched air, or oxygen used in step (a).

An objective of the invention is to substantially increase the concentration of carbon dioxide in the exhaust stream from the combustor or boiler, so that the portion of the exhaust stream that is sent to the carbon dioxide capture step can itself be concentrated and captured more efficiently than would otherwise be possible. This is achieved by returning the carbon dioxide-enriched permeate stream from the membrane separation step to the combustor. The exhaust stream preferably comprises at least 15 vol % $CO_2$.

If the gas needs to be transported to reach the equipment that carries out the carbon dioxide capture step, such as an amine or cryogenic plant, transportation of the carbon dioxide enriched exhaust gas is far simpler and less costly than transporting low concentration raw flue gas from a conventional power plant. Typically, the amount of gas that must be pipelined or otherwise transported to the carbon dioxide capture plant is reduced several fold, such as to 50%, 30%, or even 25% or less of the amount that would need to be sent if the membrane separation step were absent. This is a significant benefit of the invention.

The portion of the exhaust stream that is sent to the carbon dioxide capture step (i.e., the "first portion") preferably comprises between about 10 vol % and about 66 vol %; more preferably, between about 20 vol % and about 50 vol %; and, most preferably, between about 25 vol % and about 35 vol %, of the total exhaust stream. This can also be expressed as a split ratio, where the ratio defines the relative proportions of the flue gas sent to the carbon dioxide capture step and the membrane separation step. In general, we prefer to operate with a split ratio of between 1:1 and 1:5.

The carbon dioxide capture step preferably comprises at least one process selected from the group consisting of absorption, adsorption, liquefaction, and membrane separation, and most preferably comprises membrane separation or cryogenic condensation.

The other ("second") portion of the exhaust stream is sent to a sweep-based membrane separation step. The second portion of the exhaust stream may be sent to the membrane unit without compression, or may be compressed. Slight compression to a pressure from between about 1.5 bar up to about 5 bar, such as 2 bar, is preferred. The sweep stream preferably follows a sweep flow direction across the permeate side, the off-gas stream follows a feed flow direction across the feed side, and the sweep flow direction is substantially countercurrent to the feed flow direction. The membrane preferably exhibits a carbon dioxide permeance of at least 500 gpu, and a selectivity in favor of carbon dioxide over nitrogen of at least 10, under process operating conditions.

Another objective of the invention is to minimize the amount of $CO_2$ in the vent stream, which is often released directly to the environment. As such, the vent stream preferably comprises less than 5 vol % $CO_2$.

In certain embodiments, the exhaust gas is compressed before being treated in the carbon capture and sweep-based membrane separation steps. To provide the power necessary to drive the compressor, the compressor may be mechanically linked to an expander unit, such as a turbo-expander, in which the treated exhaust gases pass through before being released into the environment. In this way, much of the energy that is used to compress the exhaust gas before treatment is recovered in the expansion step from the treated gases. Thus, in a further embodiment, the process of the invention comprises the following steps:

(a) combusting a mixture comprising a fuel and air, oxygen-enriched air, or oxygen in a combustion apparatus, thereby creating an exhaust stream comprising carbon dioxide and nitrogen;

(b) routing the exhaust stream to a compression apparatus to compress the exhaust stream, thereby producing a compressed stream;

(c) separating a first portion of the compressed stream in a carbon dioxide capture unit adapted to selectively remove carbon dioxide, thereby producing a carbon dioxide-enriched stream and a carbon dioxide-depleted off-gas stream;

(d) providing a membrane having a feed side and a permeate side, and being selectively permeable to carbon dioxide over nitrogen and to carbon dioxide over oxygen;

(e) passing a second portion of the compressed stream across the feed side;

(f) passing air, oxygen-enriched air, or oxygen as a sweep stream across the permeate side;

(g) withdrawing from the feed side a carbon dioxide-depleted residue stream;

(h) withdrawing from the permeate side a permeate stream comprising oxygen and carbon dioxide;

(i) passing the permeate stream to step (a) as at least part of the air, oxygen-enriched air, or oxygen used in step (a); and (j) routing at least one of the carbon dioxide-depleted off-gas stream from step (c) or the carbon dioxide-depleted residue stream from step (g) as a part of a working gas stream to an expander unit, and operating the expander unit, thereby generating power and producing a vent stream.

The cost of compression is typically lower when the gas being compressed is cool. Thus, it is preferred that the exhaust stream is cooled prior to being sent to the compression apparatus. Cooling may be performed in any manner, and in one or more sub-steps, including, but not limited to, simple air or water cooling, heat exchange against other on-site process streams, chilling by external refrigerants, cooling in a condensation step, and any combinations of these. Likewise, the energy recovered in the expander unit is higher when the gas being expanded is warm. Warming may be accomplished in any way, preferably by heat exchange against the hot exhaust stream.

In certain aspects, depending on operating conditions, only one of the carbon dioxide-depleted streams for step (c) or step (g) of the above embodiment may be sent to the expander unit while the other stream undergoes further treatment, is recycled back to the process, or released into the environment. In other aspects, both streams may make up part of the working gas stream that is eventually sent to the expander unit.

The capture step in this embodiment may utilize any separation technology suitable for recovering carbon dioxide from a stream of the exhaust gas concentration as discussed above.

DETAILED DESCRIPTION OF THE INVENTION

Gas percentages given herein are by volume unless stated otherwise.

Pressures as given herein are in bar absolute unless stated otherwise.

The terms exhaust gas, off-gas, flue gas, and emissions stream are used interchangeably herein.

The terms natural gas, syngas, and fuel are used interchangeably herein.

The invention is a process for controlling carbon dioxide emissions from combustion processes by membrane-based gas separation, and combustion processes including such gas separation. The invention incorporates three unit operations: a combustion step, a carbon dioxide capture step, and a sweep-based membrane separation step, where the carbon dioxide capture step and the sweep-based membrane separation step are performed in parallel. A portion of the exhaust stream from the combustion process is routed to the carbon dioxide capture step, and the other portion is routed to the sweep-based membrane separation step.

In certain aspects, the process is expected to be particularly useful for treating flue or exhaust gas from gas-fired power plants, such as combined cycle plants, which typically use natural gas as fuel, and IGCC (Integrated Gasification Combined Cycle) plants, which use syngas, typically made by gasifying coal, as fuel. In a conventional combined cycle plant, for example, it is common to dilute the mixture of gases in the combustion chamber by feeding an excess of air, such as twice the flow needed to satisfy the stoichiometric ratio for the combustion reactions. The excess air does not take part in the reactions, but dilutes the combustion gases, thereby moderating the exhaust gas temperature. As an alternative or in addition to feeding excess air, a portion of the exhaust gas itself is sometimes returned to the combustor. In some IGCC plants, where the gasifier uses an oxygen feed, nitrogen produced as a co-product of oxygen production is used as a diluent for the fuel gas being combusted.

In a combined cycle power plant, for example, the gaseous fuel is combusted to produce a hot gas that is used to drive a gas turbine, producing power. The exhaust gas from the combustor is still very hot and so is used to boil water, producing steam that can then drive a steam turbine. The exhaust gas from this step is the flue gas to be treated in the process of the invention.

In some similar processes, the gaseous fuel is burnt to produce heat, for example, in a methane gas reformer furnace. The hot exhaust gas from the combustor is often cooled by running it through a recuperator counter to the incoming air stream to the combustor. In this case, the exhaust gas from the recuperator is the flue gas to be treated in the process of the invention.

Figure 1:
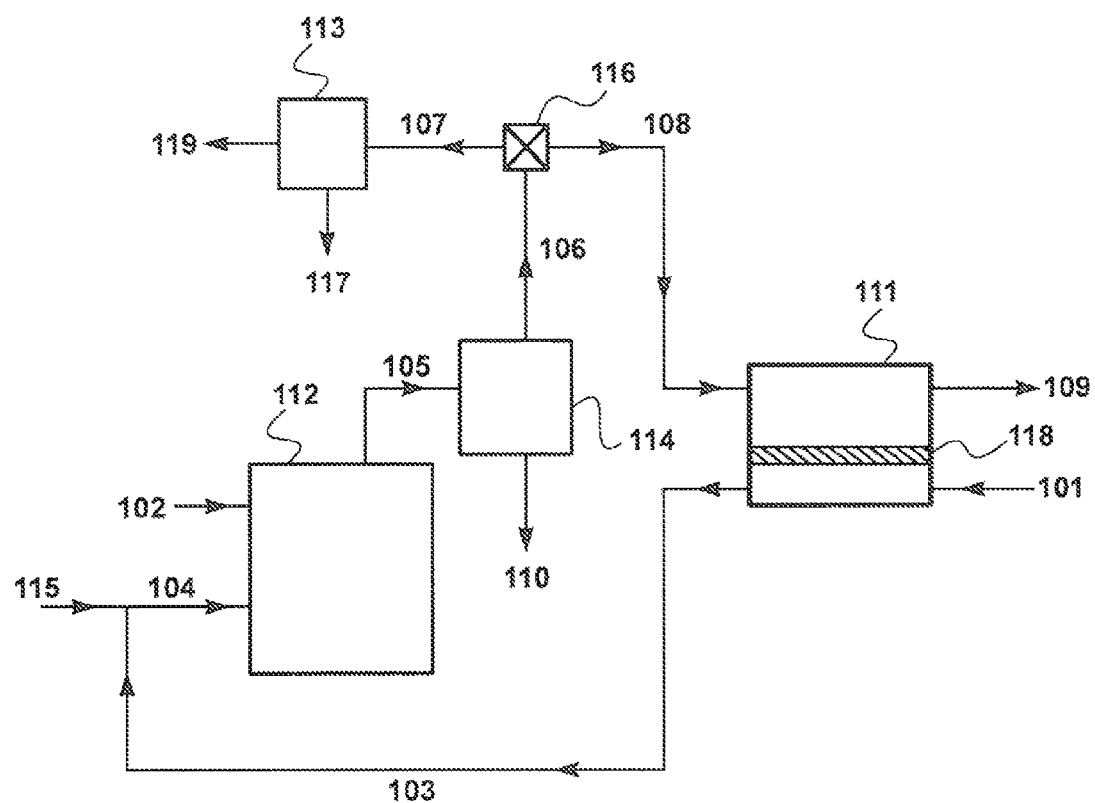
FIG. 1 is a schematic drawing of a flow scheme for a basic embodiment of the invention as it relates to a typical process for combustion of a gaseous fuel.

A simple flow scheme for one embodiment of the invention is shown in FIG. 1. Fuel stream 102 and air, oxygen-enriched air, or oxygen stream 104 are introduced into combustion step or zone 112. Stream 104 is made up of sweep stream 103 (discussed below) and, optionally, additional air or oxygen supply stream 115. The ratios of fuel and air may be adjusted as convenient in accordance with known combustion principles, such as to meet the temperature control needs of a combined cycle operation, as mentioned above. The oxygen with which the fuel is combusted may be supplied in the form of high purity oxygen, oxygen-enriched air, normal air, or any other suitable oxygen-containing mixture. The process may be carried out at atmospheric pressure or at elevated pressure.

Combustion exhaust stream 105—preferably containing at least 15 vol %; more preferably, at least 20 vol %; and, most preferably, at least 25 vol %, carbon dioxide—is withdrawn. This stream usually contains at least carbon dioxide, water vapor, nitrogen, and oxygen. Combustion exhaust stream 105 is optionally but typically routed through a condenser 114, where water 110 is knocked out of the stream. The dehydrated exhaust stream 106 is then routed through a splitter 116, where it is divided in a desired ratio into a first portion 107 and a second portion 108.

The first portion 107 of exhaust stream 106 is routed to a carbon dioxide capture step 113. The carbon dioxide capture step may be carried out using any technology or combination of technologies that can create a concentrated carbon dioxide stream from the exhaust stream. The capture step yields a concentrated carbon dioxide product stream 117 preferably containing greater than 60, 70, or 80 vol % carbon dioxide or more. This stream may be in the gas or liquid phase, or may be a supercritical fluid. The concentrated stream 117 may be sent for further processing in a sequestration step (not shown) to yield a liquid carbon dioxide product, for example, but alternatively may be used or disposed of in any other appropriate way. The off-gas stream, 119, usually contains mostly nitrogen and can be released to the environment.

The carbon dioxide capture step 113 may be carried out using membrane or non-membrane technology, and may involve one or more than one type of separation procedure. In the event that membrane technology is used in whole or part for this step, the capture step 113 remains a discrete unit operation separate from the simultaneous sweep-based membrane separation step 111.

Representative methods that may be used to capture carbon dioxide in this step include, but are not limited to, physical or chemical sorption, membrane separation, compression/low temperature condensation, adsorption, or any other known technology. Preferred technologies are absorption, such as amine scrubbing or chilled ammonia sorption, condensation, membrane separation, cryogenic condensation, and combinations of these. The benefit of using the described technology is that the carbon dioxide of the gas being treated in the capture step is substantially enriched compared to exhaust gas produced without the membrane unit. The smaller volume and higher carbon dioxide content of the gas significantly reduces the cost of the carbon dioxide capture step and processes previously uneconomical with low concentration carbon dioxide streams can be considered; for example, physical absorption, cryogenic, or membrane separation.

If membrane separation is used for the carbon dioxide capture step, it is preferred to use two or more membrane separation steps, as it is difficult to reach a high carbon dioxide concentration in the permeate stream without using multiple membrane stages. An example of a three-stage membrane unit for carbon dioxide recovery from natural gas streams is given in U.S. Pat. No. 6,648,944. Examples of multiple membrane separations steps used as a carbon dioxide capture step are given in U.S. Pat. No. 7,964,020.

Low-temperature or cryogenic condensation and absorption into an amine solution are the most common methods in current industrial use for capturing carbon dioxide and need no detailed description herein. Either method is well-suited for use in the present invention. Methods of recovering liquid carbon dioxide by cryogenic condensation or distillation are well known in the art. A preferred process is the well-known Ryan-Holmes process, in which a light hydrocarbon liquid or liquid mixture is added to the column to prevent formation of carbon dioxide solids or azeotropes in the column. Various specific techniques for carrying out low temperature condensation are taught, for example in U.S. Pat. Nos. 4,371,381; 4,923,493; 5,233,837. The Ryan-Holmes process is taught in U.S. Pat. Nos. 4,350,511 and 4,462,814, for example.

Methods of recovering carbon dioxide by absorption are also commonly used. In brief, these methods involve absorbing the carbon dioxide into a sorbent solution by physical or chemical interaction, then stripping the gas from the solution and recirculating the regenerated sorbent. Various sorbents may be used; most commonly, the sorbent is amine-based and may include a single alkanolamine or a mix of amines. Other sorbents that may be used include chilled ammonia, as in the Alstom process, or other specialized proprietary solvents.

The sorbent solution may be regenerated by steam stripping, and the carbon dioxide recovered from the stripping vapor by cooling and condensing the water. A representative process of this type that may be used is the Fluor Daniel Econamine FG™ process, which uses a monoethanolamine (MEA) based sorbent system. Very detailed descriptions of such processes can be found in the literature, for example in *Gas Purification*, A. Kohl and R. Nielsen (Fifth Edition, Gulf Publishing Co., Houston, Tex., 1997), pages 1188-1237.

Two or more different separation technologies may also be combined in this step; membrane separation may be combined with cryogenic condensation, either upstream or downstream of the condensation step, for example, or gas released in the stripping step of the absorption process may be liquefied by condensation. Examples of such combined processes are taught in U.S. Pat. Nos. 4,639,257; 4,990,168; 5,233,837; and 6,085,549, for example, all of which are incorporated herein by reference.

Concurrently with the carbon dioxide capture step, a second portion 108 of combustion exhaust stream 106 is sent for treatment in sweep-based membrane separation step or unit 111. The membrane separation unit 111 contains membranes 118 that exhibit high permeance for carbon dioxide, as well as high selectivity for carbon dioxide over nitrogen.

Any membrane with suitable performance properties may be used. Many polymeric materials, especially elastomeric materials, are very permeable to carbon dioxide. Preferred membranes for separating carbon dioxide from nitrogen or other inert gases have a selective layer based on a polyether. A number of membranes are known to have high carbon dioxide/nitrogen selectivity, such as 30, 40, 50, or above, although the selectivity may be much lower under actual operating conditions. A representative preferred material for the selective layer is Pebax®, a polyamide-polyether block copolymer material described in detail in U.S. Pat. No. 4,963,165. We have found that membranes using Pebax® as the selective polymer can maintain a selectivity of 10 or greater under process conditions.

The membrane may take the form of a homogeneous film, an integral asymmetric membrane, a multilayer composite membrane, a membrane incorporating a gel or liquid layer or particulates, or any other form known in the art. If elastomeric membranes are used, the preferred form is a composite membrane including a microporous support layer for mechanical strength and a rubbery coating layer that is responsible for the separation properties.

The membranes may be manufactured as flat sheets or as fibers and housed in any convenient module form, including spiral-wound modules, plate-and-frame modules, and potted hollow-fiber modules. The making of all these types of membranes and modules is well known in the art. To provide countercurrent flow of the sweep gas stream, the modules preferably take the form of hollow-fiber modules, plate-and-frame modules, or spiral-wound modules.

Flat-sheet membranes in spiral-wound modules is the most preferred choice for the membrane/module configuration. A number of designs that enable spiral-wound modules to be used in counterflow mode with or without sweep on the permeate side have been devised. A representative example is described in U.S. Pat. No. 5,034,126, to Dow Chemical.

Membrane step or unit 111 may contain a single membrane module or bank of membrane modules or an array of modules. A single unit or stage containing one or a bank of membrane modules is adequate for many applications. If the residue stream requires further purification, it may be passed to a second bank of membrane modules for a second processing step. If the permeate stream requires further concentration, it may be passed to a second bank of membrane modules for a second-stage treatment. Such multistage or multi-step processes, and variants thereof, will be familiar to those of skill in the art, who will appreciate that the membrane separation step may be configured in many possible ways, including single-stage, multistage, multistep, or more complicated arrays of two or more units in serial or cascade arrangements.

Although the membrane modules are typically arranged horizontally, a vertical configuration may in some cases be preferred in order to reduce the risk of deposition of particulates on the membrane feed surface.

The separation of components achieved by the membrane unit depends not only on the selectivity of the membrane for the components to be separated, but also on the pressure ratio. By pressure ratio, we mean the ratio of total feed pressure/total permeate pressure. In pressure driven processes, it can be shown mathematically that the enrichment of a component (that is, the ratio of component permeate partial pressure/component feed partial pressure) can never be greater than the pressure ratio. This relationship is true, irrespective of how high the selectivity of the membrane may be.

Further, the mathematical relationship between pressure ratio and selectivity predicts that whichever property is numerically smaller will dominate the separation. Thus, if the numerical value of the pressure ratio is much higher than the selectivity, then the separation achievable in the process will not be limited by the pressure ratio, but will depend on the selectivity capability of the membranes. Conversely, if the membrane selectivity is numerically very much higher than the pressure ratio, the pressure ratio will limit the separation. In this case, the permeate concentration becomes essentially independent of the membrane selectivity and is determined by the pressure ratio alone.

High pressure ratios can be achieved by compressing the feed gas to a high pressure or by using vacuum pumps to create a lowered pressure on the permeate side, or a combination of both. However, the higher the selectivity, the more costly in capital and energy it becomes to achieve a pressure ratio numerically comparable with or greater than the selectivity.

From the above, it can be seen that pressure-driven processes using membranes of high selectivity for the components to be separated are likely to be pressure ratio-limited. For example, a process in which a membrane selectivity of 40, 50, or above is possible (such as is the case for many carbon dioxide/nitrogen separations) will only be able to take advantage of the high selectivity if the pressure ratio is of comparable or greater magnitude.

The inventors have overcome this problem and made it possible to utilize more of the intrinsic selective capability of the membrane by diluting the permeate with the sweep gas, stream 101, thereby preventing the permeate side concentration building up to a limiting level.

This mode of operation can be used with a pressure ratio of 1, that is, with no total pressure difference between the feed and permeate sides, with a pressure ratio less than 1, that is, with a higher total pressure on the permeate side than on the feed side, or with a relatively modest pressure ratio of less than 10 or less than 5, for example.

The driving force for transmembrane permeation is supplied by lowering the partial pressure of the desired permeant on the permeate to a level below its partial pressure on the feed side. The use of the sweep gas stream 101 maintains a low carbon dioxide partial pressure on the permeate side, thereby providing driving force.

The partial pressure on the permeate side may be controlled by adjusting the flow rate of the sweep stream to a desired value. In principle, the ratio of sweep gas flow to feed gas flow may be any value that provides the desired results, although the ratio sweep gas flow:feed gas flow will seldom be less than 0.5 or greater than 10. High ratios (that is, high sweep flow rate) achieve maximum carbon dioxide removal from the feed, but a comparatively carbon dioxide dilute permeate stream (that is, comparatively low carbon dioxide enrichment in the sweep gas exiting the modules). Low ratios (that is, low sweep flow rate) achieve high concentrations of carbon dioxide in the permeate, but relatively low levels of carbon dioxide removal from the feed.

Use of a too low sweep rate may provide insufficient driving force for a good separation, and use of an overly high sweep flow rate may lead to pressure drop or other problems on the permeate side, or may adversely affect the stoichiometry in the reaction vessel. Typically and preferably, the flow rate of the sweep stream should be between about 50% and 300% of the flow rate of the membrane feed stream; more preferably, between about 80% and 200%; and, most preferably, between about 80% and 150%.

The total gas pressures on each side of the membrane may be the same or different, and each may be above or below atmospheric pressure. As mentioned above, if the pressures are about the same, the entire driving force is provided by the sweep mode operation.

In most cases, however, flue gas is available at atmospheric pressure, and the volumes of the streams involved are so large that it is not preferred to use either significant compression on the feed side or vacuum on the permeate side. However, slight compression, such as from atmospheric to 2 or 3 bar, can be helpful and can provide part of a total carbon dioxide capture and recovery process that is relatively energy efficient, as shown in the examples below. Further, if the combustion step is performed at high pressure, such as at 5 bar, 10 bar or even 20 bar, as in a combined cycle plant, for example, then process designs that involve compressing the exhaust gas to relatively higher pressures, such as 10 bar, can be contemplated. These designs enable the portion of gas sent to the carbon dioxide capture step to be sent at pressure, and enable the membrane separation step to be operated with a relatively high pressure on the permeate side, thereby reducing the amount of compression needed before the permeate/sweep stream enters the combustor.

Returning again to FIG. 1, the second portion 108 of combustion exhaust stream 106 flows across the feed side of the membranes; a sweep gas of air, oxygen-enriched air, or oxygen stream 101, flows across the permeate side. The sweep stream picks up the preferentially permeating carbon dioxide, and the resulting permeate stream 103 is withdrawn from the membrane unit and is combined with stream 115 to form the air or oxygen feed 104 to the combustor. In the alternative, stream 115 may be omitted and the entirety of the oxygen-containing feed to the combustor may be provided by the permeate stream 103.

As discussed previously, one of the additional benefits of using the combustion air or oxygen supply as the permeate sweep is that the permeating carbon dioxide removed into the sweep gas is recycled to the combustion chamber. This increases the carbon dioxide concentration in the exhaust gas leaving the combustor, facilitating the downstream capture of carbon dioxide.

The residue stream 109 resulting from the membrane sweep step 111 is reduced in carbon dioxide content to less than about 5 vol %, more preferably, to less than 3 vol %; and, most preferably, to less than 2 vol %. The residue stream 109 is typically discharged to the environment as treated flue gas.

The proportions of the flue gas that are directed to the carbon dioxide capture step and the sweep-based membrane separation step may be adjusted in conjunction with other operating parameters to tailor the processes of the invention to specific circumstances.

One of the goals of the process is to increase the carbon dioxide concentration in the feed stream to the carbon dioxide capture step, because many capture technologies, such as amine scrubbing and cryogenic condensation, have capital and/or operating costs that scale with the concentration of the component to be captured. The membrane separation step preferentially permeates carbon dioxide and returns it to the combustor, thereby forming a loop between the combustor and the membrane unit in which the carbon dioxide concentration can build up.

The more exhaust gas that is directed to the membrane unit, in other words, the smaller the split ratio, the greater is the potential to increase the carbon dioxide concentration in the loop. However, the amount of membrane area needed will increase in proportion to the volume flow of gas directed to the membrane unit. Furthermore, most membrane materials have slight selectivity for oxygen over nitrogen, so a little oxygen from the air sweep stream will tend to counterpermeate to the feed side of the membranes and be lost in the residue stream. In consequence, the concentration of oxygen in the combustor may drop, giving rise to the possibility of incomplete combustion or other problems. As an indication that the combustion step is still being provided with an adequate supply of oxygen, we prefer the process to be operated so as to provide an oxygen concentration of at least about 3 vol % in the exhaust gas stream (based on the composition after water removal.)

We have discovered that trade-offs exist between the degree of carbon dioxide enrichment that can be obtained by the membrane separation steps, the amount of oxygen lost into the residue stream, and the membrane area and compression requirements to operate the membrane separation step.

In light of these trade-offs, we believe that it is preferable to operate the process at a split ratio of between 1:9 and 2:1; more preferably, between 1:4 and 1:1; and, most preferably, between 1:2 and 1:1. A split ratio of 1:1 means that splitter, 116, divides the total flue gas flow from the combustor into two equal portions by volume. A split ratio of 1:9 means that the splitter directs one volume to the carbon dioxide capture step and nine volumes to the sweep-based membrane separation step. In other words, in the 1:1 case, 50 vol % passes to the carbon dioxide capture step, and in the 1:9 case, 10 vol % passes to the carbon dioxide capture step. To provide a good balance of efficiency and costs, we have discovered that the process should most preferably be operated at a split ratio of between about 1:3 and 1:6; that is, with about 15-25 vol % of the flue gas being sent from the combustor to the carbon dioxide capture step.

The invention is now further described by the following examples, which are intended to be illustrative of the invention, but are not intended to limit the scope or underlying principles in any way.

EXAMPLES

Example 1

Bases of Calculations for other Examples (a) Membrane permeation experiments: The following calculations were performed using a composite membrane having a polyether-based selective layer with the properties shown in Table 1.

TABLE 1

| Gas | Permeance (gpu)* | $CO_2$/Gas Selectivity |
| --- | --- | --- |
| Carbon dioxide | 1,000 | — |
| Nitrogen | 30 | 33 |
| Oxygen | 60 | 17 |
| Hydrogen | 100 | 10 |
| Water | 5,000** | — |

*Gas permeation unit; 1 gpu = $1 \times 10^{-6}$ $cm^3(STP)/cm^2 \cdot s \cdot cmHg$
**Estimated, not measured (b) Calculation methodology: All calculations were performed using a modeling program, ChemCad 5.6 (ChemStations, Inc., Houston, Tex.), containing code for the membrane operation developed by MTR's engineering group. For the calculations, all compressors and vacuum pumps were assumed to be between 75-85% efficient. In each case, the modeling calculation was performed to achieve 90% recovery of carbon dioxide from the flue gas stream, except for Examples 8 and 9.

Figure 2:
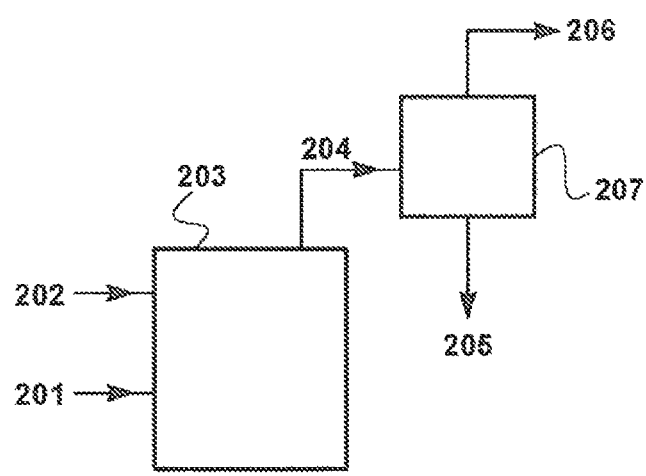
FIG. 2 is a schematic drawing of a flow scheme for a combustion process that does not include a sweep-based membrane separation step (not in accordance with the invention).

(c) "No membrane" example: A computer calculation was performed to determine the chemical composition of untreated exhaust gas from a natural gas combustion process, such as might occur in a 500 MW combined cycle power plant using about twice the stoichiometric ratio of air to fuel. FIG. 2 is a schematic drawing of a flow scheme for a combustion process that does not include a sweep-based membrane separation step.

Referring to FIG. 2, natural gas stream 202 and air stream 201 are introduced into combustion step or zone 203. (The combustion step and the oxygen with which the fuel is combined are as described in the Detailed Description, above). The combustion step was assumed to be carried out at 20 bar, a typical representative value for a combined cycle power plant. Incoming air at atmospheric pressure would typically be compressed to 20 bar in a compression step (not shown in the figure).

Combustion exhaust stream 204 is withdrawn, then routed through a condenser 207, where water 205 is knocked out of the stream. The chemical composition of the resulting untreated gas stream 206 was then calculated. The results of this calculation are shown in Table 2, below.

TABLE 2

| | Stream | | | |
|---|---|---|---|---|
| Parameter | Gas to Combustor (202) | Air Stream (201) | Condenser Knockout (205) | Exhaust Gas (206) |
| Total Flow (kg/h) | 66,000 | 2,688,000 | 113,280 | 2,640,720 |
| Temperature (° C.) | 25 | 25 | 30 | 30 |
| Pressure (bar) | 20 | 1.0 | 1.0 | 1.0 |
| Component (vol %) | | | | |
| Methane | 100.0 | 0 | 0 | 0 |
| Oxygen | 0 | 79.0 | 0 | 12.5 |
| Nitrogen | 0 | 21.0 | 0 | 80.9 |
| Carbon Dioxide | 0 | 0 | 0 | 4.5 |
| Water | 0 | 0 | 100 | 2.1 |

After the water vapor in the stream is condensed, the carbon dioxide concentration in the combustion exhaust stream is 4.5 vol %, which is too low to enable the stream to be treated economically by traditional means, such as absorption or low-temperature condensation. Emitting such a flue gas stream from a power plant would release about 3,000 ton/day of carbon dioxide to the atmosphere.

Example 2

Combustion Process with Partial Flue Gas Recycle and No Membrane Step (not in Accordance with the Invention)

Figure 3:
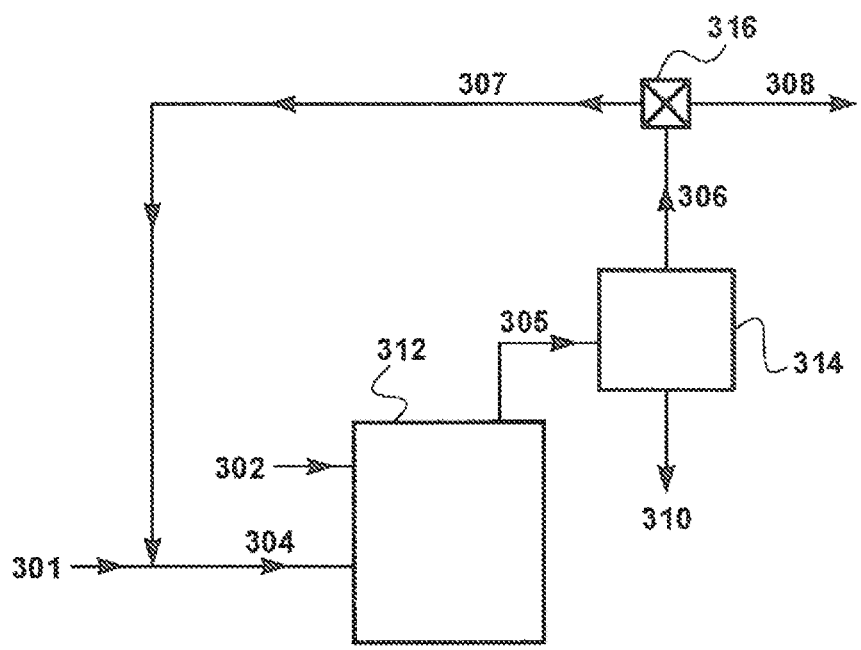
FIG. 3 is a schematic drawing of a flow scheme for a combustion process that does not include a sweep-based membrane separation step, but in which a portion of the combustion exhaust stream is routed back to the combustor (not in accordance with the invention).

A computer calculation was performed to determine the chemical composition of untreated exhaust gas from a natural gas combustion process. The process differed from the base-case calculation of Example 1 in that the intake of air was reduced to about half that of Example 1, and the remainder of the gas required for temperature and flow control in the combustor was assumed to be provided by recirculating a portion of the combustion exhaust gas to the combustor inlet, as is commonly done. FIG. 3 is a schematic drawing of a flow scheme for such a combustion process.

Referring to FIG. 3, natural gas stream 302 and air stream 304 are introduced into combustion step or zone 312. Stream 304 is made up of recycled exhaust stream 307 and additional air or oxygen supply stream 301.

Combustion exhaust stream 305 is withdrawn, then routed through a condenser 314, where water 310 is knocked out of the stream. The dehydrated exhaust stream 306 is then routed through a splitter 316, where it is divided into a first portion 307 and a second portion 308. In this example, the first portion 307 and the second portion 308 were in a ratio of 1:1. The first portion 307 of the dehydrated exhaust stream is routed back to the combustor 312.

The chemical composition of the portion 307 of the untreated gas stream which is routed back to the combustor 312 was then calculated. The results of this calculation are shown in Table 3.

TABLE 3

| | Stream | | | | |
|---|---|---|---|---|---|
| Parameter | Gas to Combustor (302) | Air Stream (301) | Condenser Knockout (310) | Recycle Gas (307) | Exhaust Gas (308) |
| Total Flow (kg/h) | 66,000 | 1,320,000 | 114,840 | 1,271,160 | 1,271,160 |
| Temperature (° C.) | 25 | 25 | 30 | 30 | 30 |
| Pressure (bar) | 20 | 1.0 | 1.0 | 1.0 | 1.0 |
| Component (vol %) | | | | | |
| Methane | 100 | 0 | 0 | 0 | 0 |
| Oxygen | 0 | 79.0 | 0 | 3.2 | 3.2 |
| Nitrogen | 0 | 21.0 | 0 | 83.0 | 83.0 |
| Carbon Dioxide | 0 | 0 | 0 | 9.5 | 9.5 |
| Water | 0 | 0 | 100 | 4.3 | 4.3 |

The gas 307 that is recycled to the combustor contains a higher concentration of carbon dioxide, at 9.5 vol %, than the exhaust gas in Example 1, above. The recycle gas 307 also contains 3.2 vol % oxygen. The effect of recycling part of the exhaust stream 308 is to produce a vent gas containing an undesirably high level of carbon dioxide, at 9.5 vol %. Emitting such flue gas to the atmosphere would release over 4,000 ton/day of carbon dioxide.

Example 3

Process of the Invention

The calculations for this Example were performed using the flow scheme shown in FIG. 1 and described in the Detailed Description, above. This flow scheme includes a sweep-based membrane separation step 111, which was assumed to be carried out using membranes having the permeation properties listed in Table 1. In this calculation, stream 105 leaving the combustor was at a pressure of 3 bar, which facilitated the operation of the membrane sweep and the carbon dioxide capture step.

To facilitate operation of the calculation software, for Examples 3 through 7, the base case air flow provided to the combustor via the membrane permeate side was assumed to be about 975 m³/h (1,250 kg/h), compared with the typical air flow to a 500 MW power plant of about 1.8 million m³/h used for the calculations of Examples 1 and 2. In other words, the scale of the calculation for the following Examples was about 1/1,200 of the scale for a typical natural gas-fired power plant. This reduces membrane area proportionately, but does not affect the relative flow rates or compositions of the streams involved. The results of this calculation are shown in Table 3, below.

The membrane area was assumed to be 550 m², and the combustion exhaust stream split ratio was set at 1:7 (flow to carbon dioxide capture step:flow to sweep-based membrane separation step). Air flow 101 to the combustor was assumed to be 1,250 kg/h, about the same as in Example 2. The results of this calculation are shown in Table 4.

be seen that the process is effective in capturing 90% of the carbon dioxide emitted from the combustion section of the power plant.

Example 4

Treatment of Flue Gas from Combined Cycle Gas-fired Plant by Amine Scrubbing Only (not in Accordance with the Invention)

Figure 4:
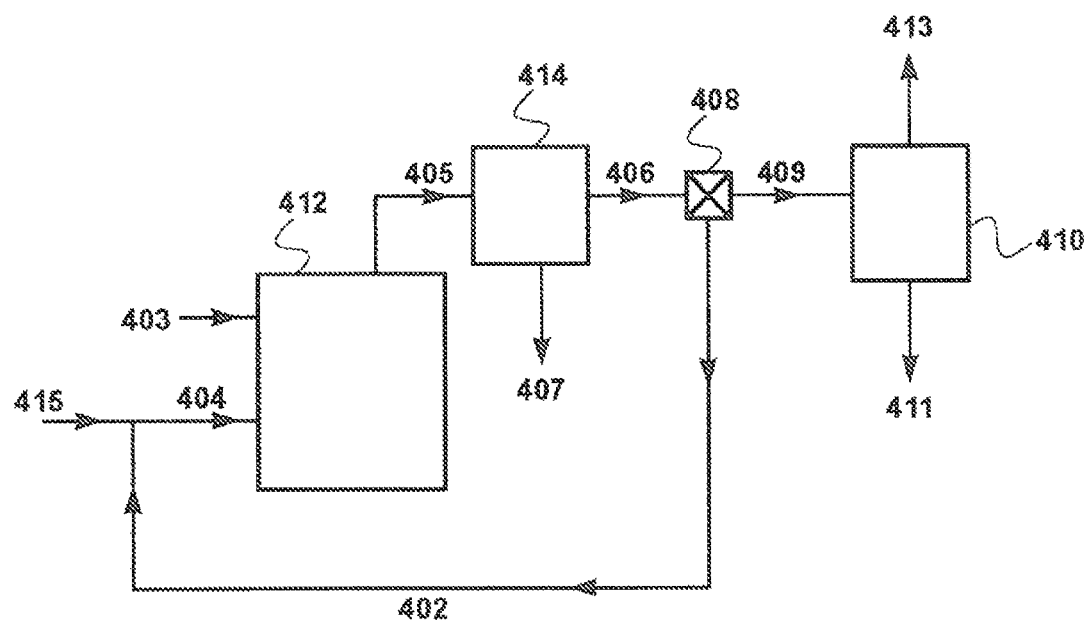
FIG. 4 is a schematic drawing of a flow scheme for a combustion process in which a portion of the combustion exhaust stream is routed to an amine scrubbing plant and the other portion is routed back to the combustor (not in accordance with the invention).

A computer calculation was performed to determine the chemical composition of exhaust gas from a natural gas combustion process, where an amine-based carbon dioxide capture step is performed, but no sweep-based membrane separation step is used. It was assumed that a portion of the exhaust gas from the combustor was recirculated to the combustion step as a diluent for temperature control. FIG. 4 is a schematic drawing of a flow scheme for such a combustion process.

Referring to FIG. 4, natural gas 403 and air stream 404 are introduced into combustion step or zone 412. Stream 404 is made up of recycled exhaust stream 402 and additional air or oxygen supply stream 415.

TABLE 4

| | Stream | | | | | |
|---|---|---|---|---|---|---|
| | Methane (102) | Stream to Carbon Dioxide Capture (107) | Membrane Feed (108) | Air Stream (101) | Gas to Combustor (103) | Treated Exhaust Gas (109) |
| Parameter | | | | | | |
| Total Flow (kg/h) | 55 | 298 | 1,790 | 1,250 | 2,154 | 885 |
| Temperature (° C.) | 25 | 30 | 30 | 25 | 29 | 25 |
| Pressure (bar) | 20 | 3.0 | 3.0 | 1.0 | 1.0 | 3.0 |
| Component (vol %) | | | | | | |
| Methane | 100 | 0 | 0 | 0 | 0 | 0 |
| Oxygen | 0 | 3.4 | 3.4 | 79.0 | 13.7 | 6.2 |
| Nitrogen | 0 | 60.3 | 60.3 | 21.0 | 57.3 | 92.8 |
| Carbon Dioxide | 0 | 34.9 | 34.9 | 0 | 27.9 | 1.0 |
| Water | 0 | 1.4 | 1.4 | 0 | 1.2 | 0 |

In this example, the treated exhaust gases at a pressure of 3 bar are discharged to the atmosphere. However, one or both of these gas streams could be expanded through a turbo-expander unit to recover some of the power used in the combustion operation, for example, to compress stream 104 to the pressure required by the combustion process.

Compared with the "no membrane" Examples 1 and 2, the carbon dioxide content in the combustion exhaust stream (membrane feed) 108 is greatly elevated at 34.9 vol %. The oxygen content of the combustion exhaust stream 108 is 3.4 vol %. The carbon dioxide content of the treated flue gas 109 is reduced to a very low level of 1.0 vol %. Venting of a stream of this composition to the atmosphere would release only 400 ton/day of carbon dioxide from a 500 MW power plant. Comparing this example with Examples 1 and 2, it can Combustion exhaust stream 405 is withdrawn, then routed through a condenser 414, where water 407 is knocked out of the stream. The dehydrated exhaust stream 406 is then routed to a splitter 408, from which a first portion 409 of the exhaust stream is routed to an amine scrubbing plant 410, where carbon dioxide-rich stream 411 is withdrawn, and carbon dioxide-depleted stream 413 is routed to the environment as treated flue gas. The other portion 402 of the exhaust stream is routed back to the combustor 412 as stream 402. In this example, the split ratio was 3:2, meaning that 60 vol % of the exhaust stream was routed to the amine-based carbon dioxide capture step 410 and the remaining 40 vol % of the exhaust stream was routed back to the combustor 412.

The chemical composition of the gas stream 402 which is routed back to the combustor 412 was then calculated. The results of this calculation are shown in Table 5.

TABLE 5

| | Stream | | | | | | |
|---|---|---|---|---|---|---|---|
| | Air (415) | Gas to Combustor (402) | Methane (403) | Flue Gas (406) | Amine Plant Feed (409) | $CO_2$ Concentrate Stream (411) | Vent Gas From Amine Unit (413) |
| Parameter | | | | | | | |
| Total Flow (kg/h) | 1,250 | 800 | 55 | 2,013 | 1,213 | 151 | 1,062 |
| Temperature (° C.) | 25 | 30 | 25 | 30 | 30 | 30 | 30 |
| Pressure (bar) | 1.0 | 1.0 | 10.0 | 1.0 | 1.0 | 1.0 | 1.0 |
| Component (vol %) | | | | | | | |
| Methane | 0 | 0 | 100 | 0 | 0 | 0 | 0 |
| Oxygen | 21.0 | 5.4 | 0 | 5.4 | 5.4 | 0.6 | 5.8 |
| Nitrogen | 79.0 | 82.1 | 0 | 82.1 | 82.1 | 1.0 | 89.5 |
| Carbon Dioxide | 0 | 8.2 | 0 | 8.2 | 8.2 | 98.2 | 0.09 |
| Water | 0 | 4.3 | 0 | 4.3 | 4.3 | 0.2 | 4.6 |

The carbon dioxide-rich stream 411 withdrawn from the amine scrubbing step 410 contains a carbon dioxide concentration of 98.2 vol %, and recovers essentially all of the carbon dioxide from the combustor. The gas stream 402 that is recycled to the combustor contains 8.2 vol % carbon dioxide and 5.4 vol % oxygen concentration.

Example 5

Process of the Invention Treating Flue Gas from Combined Cycle Gas-fired Plant

The calculations for this Example were performed using the flow scheme shown in FIG. 1 and described in the Detailed Description, above. This flow scheme includes an amine scrubbing step 113 performed in parallel with a sweep-based membrane separation step 111.

In this set of calculations, the membrane area was assumed to be 2,800 m², and the combustion exhaust stream split was set at 1:5 (flow to carbon dioxide capture step:flow to sweep-based membrane separation step), these parameters being set to achieve about 90 vol % carbon dioxide recovery. Air flow 101 is 1,250 kg/h. The results of this calculation are shown in Table 6.

109 that is released to the environment contains 1.2 vol % carbon dioxide.

The concentration of carbon dioxide in the feed stream to the amine unit is about 32 vol %, compared with only 8 vol % in Example 4. The flow of gas routed to the amine plant is cut to from about 1,200 kg/h to 304 kg/h, which would cut the required capacity of the amine plant to about a quarter of the corresponding prior art requirement.

Example 6

Treatment of Flue Gas from Combined Cycle Gas-fired Plant by Amine Scrubbing at Pressure (not in Accordance with the Invention)

A computer calculation was performed to determine the chemical composition of exhaust gas from a natural gas combustion process, where an amine-based carbon dioxide capture step is performed, but no sweep-based membrane separation step is used. The calculation differs from that of Example 4 in that the exhaust gas was assumed to be compressed to 10 bar before being routed to the amine

TABLE 6

| | Stream | | | | | | | |
|---|---|---|---|---|---|---|---|---|
| | Air (115) | Gas to Combustor (103) | Methane (102) | Amine Plant Feed (107) | $CO_2$ Conc. Stream (117) | Vent Gas From Amine Unit (119) | Membrane Feed (108) | Membrane Residue Treated Flue Gas (109) |
| Parameter | | | | | | | | |
| Total Flow (kg/h) | 1,250 | 1,884 | 55 | 304 | 129 | 175 | 1,520 | 864 |
| Temperature (° C.) | 25 | 29 | 25 | 30 | 30 | 30 | 30 | 25 |
| Pressure (bar) | 1.0 | 1.0 | 10.0 | 1.0 | 1.0 | 1.0 | 1.0 | 1.0 |
| Component (vol %) | | | | | | | | |
| Methane | 0 | 0 | 100 | 0 | 0 | 0 | 0 | 0 |
| Oxygen | 21.0 | 12.3 | 0 | 7.1 | 0.02 | 1.0 | 7.1 | 6.1 |
| Nitrogen | 79.0 | 59.9 | 0 | 63.1 | 0.2 | 92.3 | 63.1 | 92.8 |
| Carbon Dioxide | 0 | 24.4 | 0 | 31.9 | 99.7 | 0.5 | 31.9 | 1.2 |
| Water | 0 | 0.3 | 0 | 4.3 | 0.04 | 6.2 | 4.3 | 0 |

Figure 5:
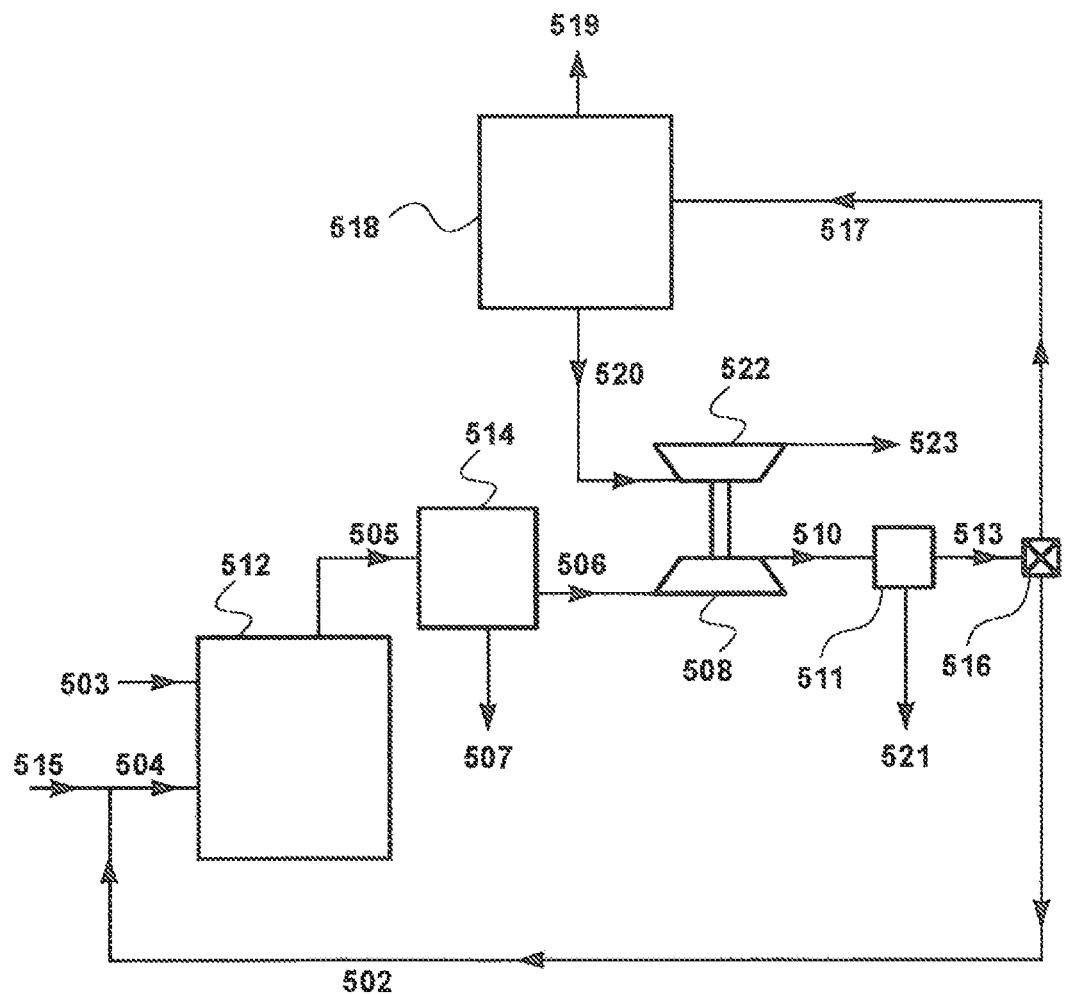
FIG. 5 is a schematic drawing of a flow scheme for a combustion process in which the combustion exhaust stream is compressed and a portion of the compressed stream is routed to an amine scrubbing plant, and the other portion is routed back to the combustor. The compressed nitrogen-rich exhaust stream from the amine scrubbing process is then routed back to provide power to the compressor (not in accordance with the invention).

The carbon dioxide-rich stream 117 from the amine scrubbing step contains 99.7 vol % carbon dioxide. The stream 103 that is routed back to the combustor contains relatively high concentrations of both carbon dioxide and oxygen, at 24.4 and 12.3 vol %, respectively. The flue gas scrubbing plant. In a combined cycle plant, the air coming into the combustor is normally compressed to high pressure, such as 10 bar or more. Compressing the exhaust gas means that diluent gas diverted from the flue gas stream to be recycled to the combustor will be at high pressure, and may be returned without recompression, thereby saving on the compressor capacity used in the combustion/power generation steps. The amine plant is also operated at pressure. FIG. 5 is a schematic drawing of a flow scheme for such a combustion process.

Referring to FIG. 5, natural gas 503 and air stream 504 are introduced into combustion step or zone 512. Stream 504 is made up of recycled exhaust stream 502 and additional air or oxygen supply stream 515.

Combustion exhaust stream 505 is withdrawn, then routed through a condenser 514, where water 507 is knocked out of the stream. The dehydrated exhaust stream 506 is then routed to a compressor 508, where it is compressed to 10 bar. The compressed exhaust stream 510 passes through aftercooler/separator 511, yielding water stream, 521, and compressed stream, 513. Stream 513 then passes to splitter 516, from which a first portion 517 of the exhaust stream is routed to an amine scrubbing plant 518, which operates under pressure to produce carbon dioxide-rich stream 519, which is withdrawn, and compressed nitrogen-rich off-gas stream, 520. This stream remains at pressure and is routed to turbo-expander, 522, which is linked in power-transferring relationship to compressor, 508. A substantial portion of the power required to drive compressor 508 can be generated in this way.

The other portion 502 of the exhaust stream is routed back to the combustor 512 as stream 502. This stream remains at 10 bar, so it can be returned at essentially this pressure to the combined cycle combustion/power generation step. In this example, 60 vol % of the exhaust stream was routed to the amine scrubbing step, 518, and the remaining 40 vol % of the exhaust stream was routed back to the combustor 512.

Figure 6:
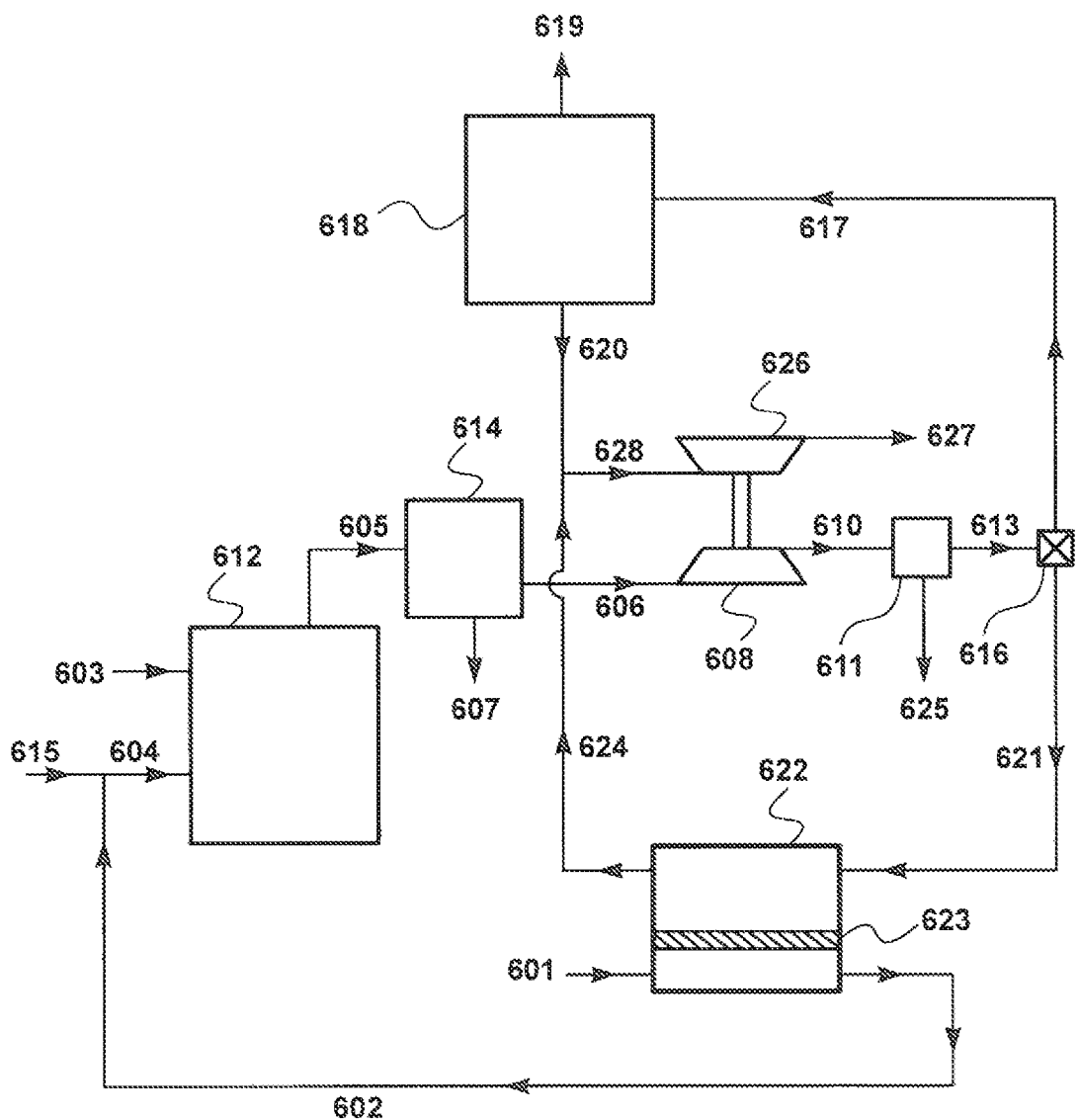
FIG. 6 is a schematic drawing of a flow scheme for a combustion process in accordance with the invention in which the combustion exhaust stream is compressed and a portion of the compressed stream is routed to an amine scrubbing plant, and the other portion is routed to a sweep-based membrane separation step. The sweep stream from the membrane separation step is then routed back to the combustor.

The chemical composition of the gas stream 502 which is routed back to the combustor 512 was then calculated. The results of this calculation are shown in Table 7.

capture step and sweep-based membrane separation step are performed in parallel. The calculation differs from that of Example 5 in that the exhaust gas was assumed to be compressed to 10 bar, as in Example 6. FIG. 6 is a schematic drawing of a flow scheme for such a combustion process.

Referring to FIG. 6, natural gas 603 and air stream 604 are introduced into combustion step or zone 612. Stream 604 is made up of recycled exhaust stream 602 and additional air or oxygen supply stream 615.

Combustion exhaust stream 605 is withdrawn, then routed through a condenser 614, where water 607 is knocked out of the stream. The dehydrated exhaust stream 606 is then routed to a compressor 608, where it is compressed to 10 bar. The compressed exhaust stream 610 passes through aftercooler/separator 611, yielding water stream 625. Stream 613 passes to splitter 616, from which a first portion 617 of the exhaust stream is routed to an amine scrubbing plant 618, which operates under pressure to produce carbon dioxide-rich stream 619, which is withdrawn, and compressed nitrogen-rich off-gas stream, 620. This stream remains at pressure and is routed, via line 628, to turbo-expander, 626, which is linked in power-transferring relationship to compressor, 608. A substantial portion of the power required to drive compressor 608 can be generated in this way.

The other portion 621 of the exhaust stream is routed to a sweep-based membrane separation step 622. Membrane unit 622 contains membranes 623 which exhibit a high permeance for carbon dioxide, as well as high selectivity for carbon dioxide over nitrogen. The compressed, condensed exhaust stream 621 flows across the feed side of the membranes; a sweep gas of air, 601 flows across the permeate side. The sweep stream picks up the preferentially permeating carbon dioxide, and the resulting permeate stream 602 is withdrawn from the membrane unit and is combined with stream 615 to form the air or oxygen feed 604 to the

TABLE 7

| | Stream | | | | | |
|---|---|---|---|---|---|---|
| | Air (515) | Gas to Combustor (502) | Methane (503) | Flue Gas (506) | Amine Plant Feed (517) | $CO_2$ Concentrate Stream (519) | Vent Gas From Amine Unit (520) |
| Parameter | | | | | | | |
| Total Flow (kg/h) | 1,250 | 800 | 55 | 2,013 | 1,213 | 151 | 1,062 |
| Temperature (° C.) | 25 | 30 | 25 | 30 | 30 | 30 | 30 |
| Pressure (bar) | 1.0 | 10.0 | 10.0 | 1.0 | 10.0 | 1.0 | 10.0 |
| Component (vol %) | | | | | | | |
| Methane | 0 | 0 | 100 | 0 | 0 | 0 | 0 |
| Oxygen | 21.0 | 5.4 | 0 | 5.4 | 5.4 | 0.6 | 5.8 |
| Nitrogen | 79.0 | 82.1 | 0 | 82.1 | 82.1 | 1.0 | 89.5 |
| Carbon Dioxide | 0 | 8.2 | 0 | 8.2 | 8.2 | 98.2 | 0.09 |
| Water | 0 | 4.3 | 0 | 4.3 | 4.3 | 0.2 | 4.6 |

The carbon dioxide-rich stream 519 withdrawn from the amine scrubbing step 518 contains a carbon dioxide concentration of 98.2 vol %. The gas stream 502 that is recycled to the combustor contains a relatively low concentration of carbon dioxide at 8.2 vol %, and an oxygen concentration of 5.4 vol %.

Example 7

Process of the Invention Treating Flue Gas from Combined Cycle Gas-fired Plant at Pressure A computer calculation was performed to determine the chemical composition of exhaust gas from a natural gas combustion process, where an amine-based carbon dioxide combustor. The nitrogen-rich exhaust stream 624 from the membrane separation step 622 remains at pressure and is combined with the off-gas stream 620 from the amine scrubbing step to form stream 628, which is then routed to the turbo-expander, 626, to provide power to drive compressor 608. The resulting treated flue gas stream 627 is released to the environment.

In this example, about 17 vol % of the exhaust stream was routed to the amine-based carbon dioxide capture step 618 and the remaining 83 vol % of the exhaust stream was routed to the sweep-based membrane separation step 622.

The chemical composition of the gas stream 602 which is routed back to the combustor 612 was then calculated. The results of this calculation are shown in Table 8.

TABLE 8

| | Stream | | | | | | | |
|---|---|---|---|---|---|---|---|---|
| | Air (601) | Gas to Combustor (602) | Methane (603) | Amine Plant Feed (617) | $CO_2$ Conc. Stream (619) | Vent Gas From Amine Unit (620) | Membrane Feed (621) | Membrane Residue Treated Flue Gas (624) |
| Parameter | | | | | | | | |
| Total Flow (kg/h) | 1,250 | 2,163 | 55 | 349 | 148 | 202 | 1,746 | 833 |
| Temperature (° C.) | 25 | 27 | 25 | 30 | 30 | 30 | 30 | 25 |
| Pressure (bar) | 1.0 | 1.0 | 10.0 | 10.0 | 10.0 | 10.0 | 10.0 | 10.0 |
| Component (vol %) | | | | | | | | |
| Methane | 0 | 0 | 100 | 0 | 0 | 0 | 0 | 0 |
| Oxygen | 0 | 14.5 | 0 | 4.4 | 0.2 | 6.4 | 4.4 | 6.0 |
| Nitrogen | 79.0 | 59.7 | 0 | 62.9 | 0.2 | 92.5 | 62.9 | 93.8 |
| Carbon Dioxide | 21.0 | 25.4 | 0 | 32.2 | 99.7 | 0.5 | 32.2 | 0.13 |
| Water | 0 | 0.4 | 0 | 0.4 | 0 | 0.7 | 4.5 | 0 |

The carbon dioxide-rich stream 619 from the amine scrubbing step contains 99.7 vol % carbon dioxide. The stream 602 that is routed back to the combustor contains relatively high concentrations of both carbon dioxide and oxygen, at 25.4 and 14.5 vol %, respectively. The flue gas 627 that is released to the environment—which is a combination of streams 620 and 624—contains 0.2 vol % carbon dioxide.

The concentration of carbon dioxide in the feed stream to the amine unit is about 32 vol %, compared with only 8 vol % in Example 6. The flow of gas routed to the amine plant is cut to from about 1,200 kg/h to 349 kg/h, which would cut the required capacity of the amine plant to slightly more than a quarter of the corresponding prior art requirement.

Example 8

Figure 7:
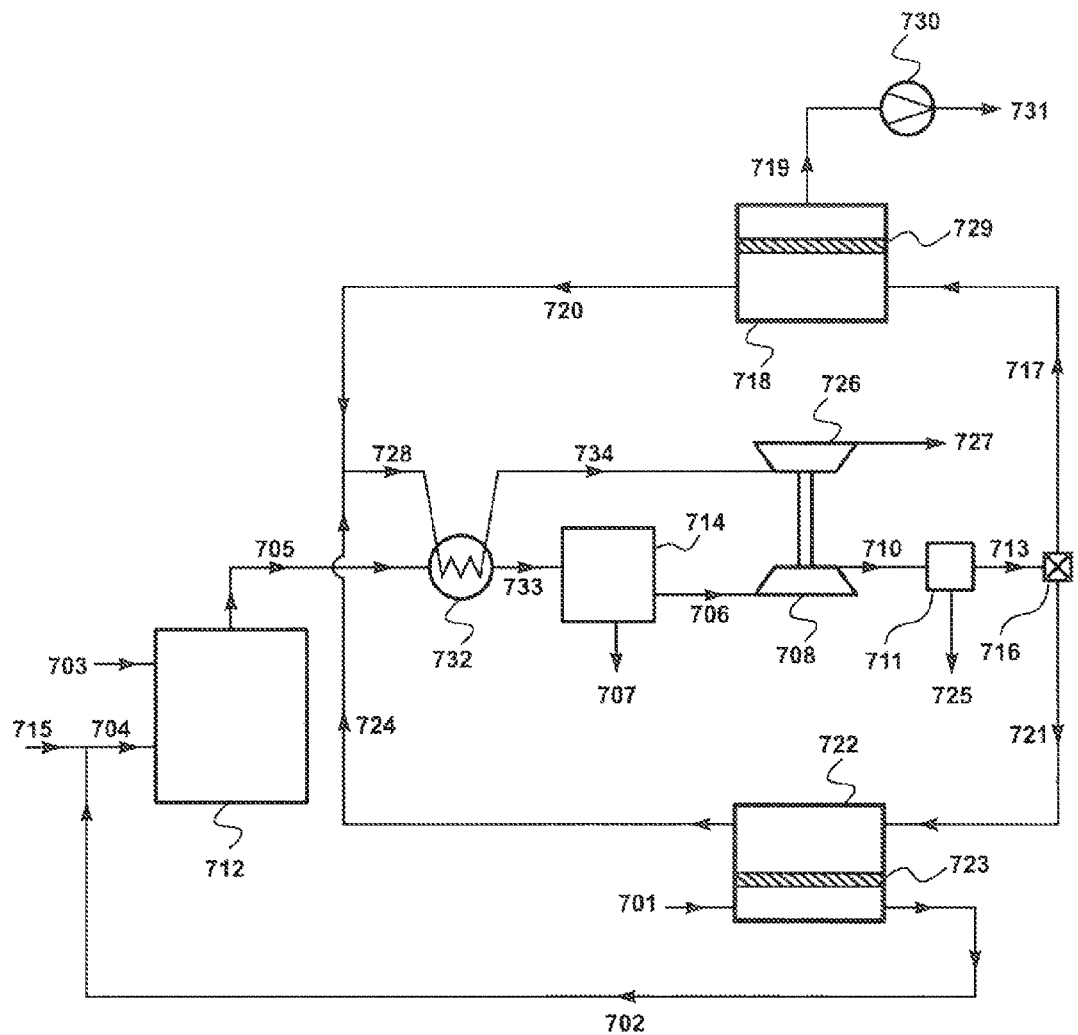
FIG. 7 is a schematic drawing of a flow scheme for a variant of the process of FIG. 6, in which membrane separation is used in the carbon dioxide capture step rather than an amine scrubbing plant.

Combustion Process with Parallel Carbon Capture and Sweep-based Membrane Separation Steps According to FIG. 7

A computer calculation was performed to determine the chemical composition of exhaust gas from a natural gas combustion process, where a membrane-based carbon dioxide capture step and sweep-based membrane separation step are performed in parallel. The exhaust gas was assumed to be compressed to 5 bar. It was further assumed that the engine (or boiler) of the combustion step produces about 1 ton/h of $CO_2$ in its exhaust gas and about 2-2.5 MW of power as electricity (or about 5 MW of power as steam). FIG. 7 is a schematic drawing of a flow scheme for such a combustion process.

Referring to FIG. 7, natural gas 703 and air stream 704 are introduced into combustion step or zone 712. Stream 704 is made up of recycled exhaust stream 702 and additional air or oxygen supply stream 715.

Combustion exhaust stream 705 is withdrawn, and passed through a heat exchanger, 732. This exhaust gas is often quite hot, typically in the range of 100-200° C. The gas is cooled in unit 732 to produce cooled stream 733. This stream is then routed through a condenser 714, where water 707 is knocked out. The dehydrated exhaust stream, 706, is then routed to a compressor, 708, where it is compressed to 5 bar. The compressed exhaust stream, 710, passes through aftercooler/separator 711, yielding water stream 725. Stream 713 passes to splitter 716, from which a first portion 717 of the exhaust stream (about ⅓) is routed to a membrane separation carbon dioxide capture step 718. The membrane of step 718 contains membrane(s) 729 which exhibit a high permeance for carbon dioxide, as well as high selectivity for carbon dioxide over nitrogen. Accordingly, step 718 produces a permeate stream, 719, enriched in carbon dioxide as compared to the feed stream 717 and a carbon dioxide-depleted, nitrogen-rich residue stream, 720.

Permeate stream 719 is withdrawn from step 718 using a vacuum pump, 730, which produces a carbon dioxide concentrated stream, 731. This stream can be further compressed, condensed and purified to produce liquid, high pressure carbon dioxide suitable for many uses. The energy cost of the operation is about 100 KW. Residue stream 720 remains at pressure and is eventually routed, via lines 728 and 734 (discussed below), to a turbo-expander, 726, which is linked in power-transferring relationship to compressor 708. A substantial portion of the power required to drive compressor 708 can be generated in this way.

The other/second portion of the exhaust stream, 721, is routed to a sweep-based membrane separation step 722. Membrane or membranes 723 exhibit a high permeance for carbon dioxide, as well as high selectivity for carbon dioxide over nitrogen. The compressed, condensed exhaust stream 721 flows across the feed side of the membranes; a sweep gas of air, 701 flows across the permeate side. The sweep stream picks up the preferentially permeating carbon dioxide, and the resulting permeate stream 702 is withdrawn from the membrane unit and is combined with stream 715 to form the air or oxygen feed 704 to the combustor. The nitrogen-rich exhaust stream 724 from the membrane separation step 722 remains at pressure and is, in this example, combined with the residue stream from step 718 to form a working gas/mixed gas stream 728. This stream undergoes a heat exchange against the hot exhaust stream 705 in heat exchanger 732, which produces a warmed stream 734. Warmed stream 734 is then routed to the turbo-expander, 726, to provide power to drive compressor 708. The resulting treated flue gas stream 727 is released to the environment.

Using stream 728 going to the turbo expander, 726, to help cool stream 705 going to compressor 708 is beneficial. The energy cost of compression is lower when the gas being compressed is cool. Correspondingly, the energy recovered in a turbo expander is higher when the gas being expanded is warm.

In this example, about 30 vol % of the exhaust stream was routed to the membrane-based carbon dioxide capture step 718 and the remaining 70 vol % of the exhaust stream was routed to the sweep-based membrane separation step 722.

The chemical composition of the gas stream 702 which is routed back to the combustor 712 was then calculated. The results of this calculation are shown in Table 9.

TABLE 9

| | Air (701) | Gas to Combustor (702) | Exhaust Gas (705) | Compressed/ Condensed Exhaust Stream (721) | $CO_2$ Conc. Stream (731) | First Membrane Residue Stream (720) | Sweep-based Membrane Residue Treated Flue Gas (724) | Released Treated Flue Gas (727) |
|---|---|---|---|---|---|---|---|---|
| Parameter | | | | | | | | |
| Total Flow (kg/h) | 7,280 | 9,580 | 9,950 | 6,410 | 810 | 1,940 | 4,110 | 6,050 |
| Temperature (° C.) | 30 | 50 | 150 | 60 | 230 | 60 | 30 | 13 |
| Pressure (bar) | 1.0 | 1.0 | 1.0 | 5.0 | 1.0 | 5.0 | 5.0 | 1.0 |
| Component (vol %) | | | | | | | | |
| Methane | 0.0 | 0.0 | 0.0 | 0.0 | 0.0 | 0.0 | 0.0 | 0.0 |
| Oxygen | 21.0 | 16.8 | 2.1 | 2.4 | 1.4 | 2.8 | 3.7 | 3.4 |
| Nitrogen | 79.0 | 69.8 | 65.2 | 74.8 | 23.5 | 91.2 | 93.1 | 92.5 |
| Carbon Dioxide | 0.0 | 12.1 | 18.0 | 20.7 | 66.9 | 6.0 | 3.2 | 4.1 |
| Water | 0.0 | 1.3 | 14.7 | 2.1 | 8.2 | 0.0 | 0.0 | 0.0 |

The carbon dioxide-rich stream 731 from the membrane-based carbon dioxide capture step 718 contains about 67% of carbon dioxide (about 73 vol % on a dry basis). The stream 702 that is routed back to the combustor contains relatively high concentrations of both carbon dioxide and oxygen, at 12.1 and 16.8 vol %, respectively. The flue gas 727 that is released to the environment—which is a combination of streams 720 and 724—contains 4.1 vol % carbon dioxide.

The total process uses about 310 KW in the turbo compressor/expander and another 40 KW in the vacuum pump. Another 100 KW is used to condense/liquefy/purify the carbon dioxide in stream 731, so the total energy use is about 450 KW or about 20% of the power produced by the engine. The system captures about 63% of the carbon dioxide produced by the plant.

Example 9

Figure 8:
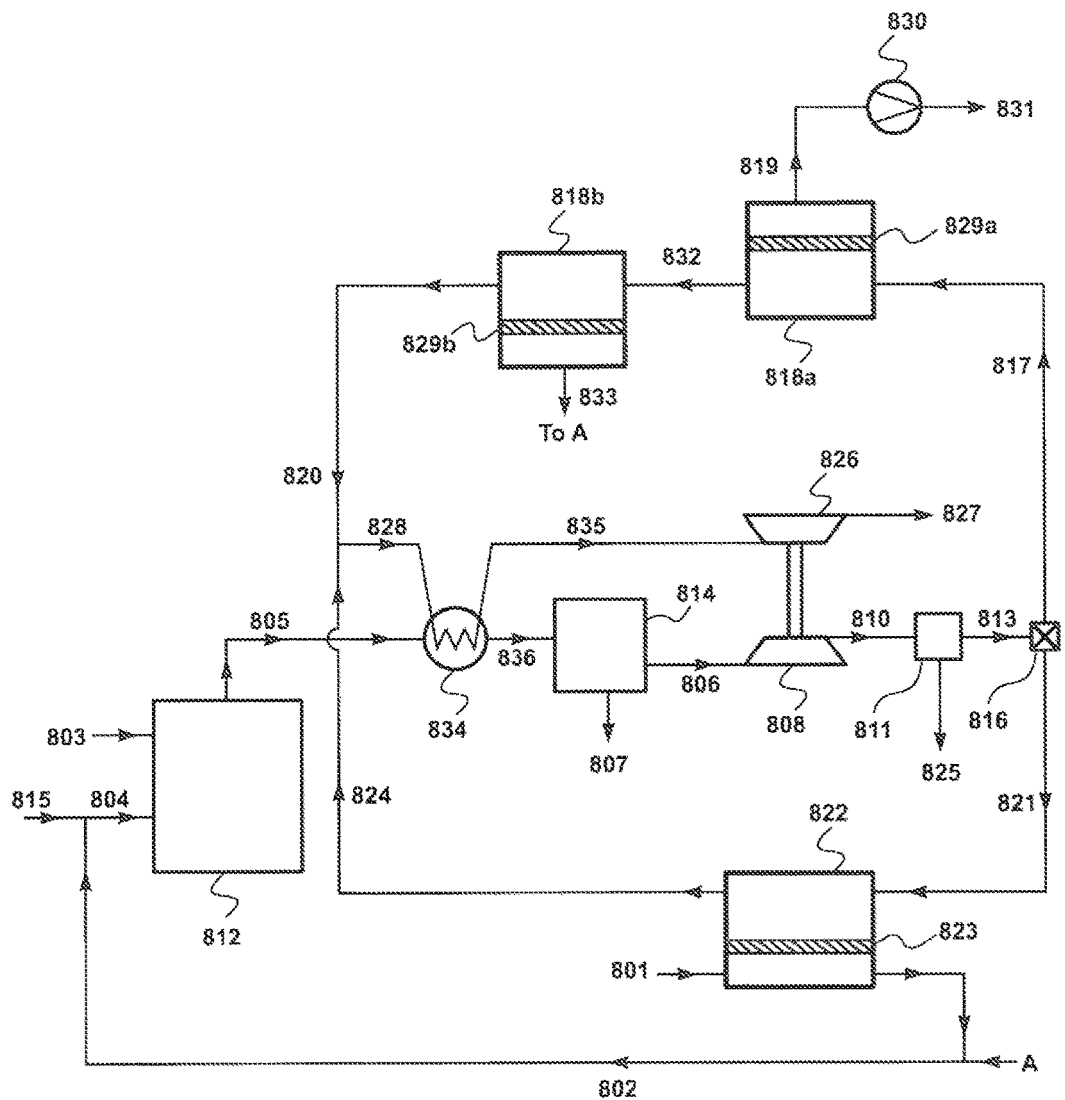
FIG. 8 is a schematic drawing of a flow scheme for a variant of the process of FIG. 7, in which two membrane separation steps are used in the carbon dioxide capture step.

Combustion Process with Parallel Carbon Capture and Sweep-based Membrane Separation Steps According to FIG. 8

A computer calculation was performed to determine the chemical composition of exhaust gas from a natural gas combustion process, where a two-step membrane-based carbon dioxide capture step and sweep-based membrane separation step are performed in parallel. The exhaust gas was assumed to be compressed to 5 bar. It was further assumed that the engine (or boiler) of the combustion step produces about 1 ton/h of $CO_2$ in its exhaust gas and about 2 MW of power as electricity (or about 5 MW of power as steam). FIG. 8 is a schematic drawing of a flow scheme for such a combustion process.

Referring to FIG. 8, natural gas 803 and air stream 804 are introduced into combustion step or zone 812. Stream 804 is made up of recycled exhaust stream 802 and additional air or oxygen supply stream 815.

Combustion exhaust stream 805 is withdrawn and passed through a heat exchanger, 834, where it is cooled to produce cooled stream 836. This stream is then routed through a condenser, 814, where water 807 is knocked out. The dehydrated exhaust stream 806 is then routed to a compressor, 808, where it is compressed to 5 bar. The compressed exhaust stream, 810, passes through aftercooler/separator 811, yielding water stream 825. Stream 813 passes to splitter 816, from which a first portion 817 of the exhaust stream is routed to a two-step membrane separation carbon dioxide capture step, 818a-b. Step 818a-b contains membranes 829a-b, which exhibit a high permeance for carbon dioxide, as well as high selectivity for carbon dioxide over nitrogen.

In step 818a, a first permeate stream, 819, enriched in carbon dioxide as compared to feed stream 817, is withdrawn using a vacuum pump, 830, which produces a carbon dioxide concentrated stream, 831. This stream can be further compressed, condensed and purified to produce liquid, high pressure carbon dioxide suitable for many uses. The energy cost of the operation is about 100 KW. First residue stream 832 remains at pressure and is routed as a feed stream to step 818b.

In step 818b, a second permeate stream, 833, enriched in carbon dioxide compared to stream 832, is sent back to the combustor step 812 as part of the recycled exhaust stream 802. A second residue stream, 820, remains at pressure and is routed, via lines 828 and 835 (discussed below), to a turbo-expander, 826, which is linked in power-transferring relationship to compressor 808. A substantial portion of the power required to drive compressor 808 can be generated in this way.

The other/second portion of the exhaust stream, 821, is routed to a sweep-based membrane separation step 822. Membrane or membranes 823 exhibit a high permeance for carbon dioxide, as well as high selectivity for carbon dioxide over nitrogen. The compressed, condensed exhaust stream 821 flows across the feed side of the membranes; a sweep gas of air, 801 flows across the permeate side. The sweep stream picks up the preferentially permeating carbon dioxide, and the resulting permeate stream 802 is withdrawn from the membrane unit and is combined with streams 815 and 833 to form the air or oxygen feed, 804, to the combustor. The nitrogen-rich exhaust stream 824 from the membrane separation step 822 remains at pressure and is combined with the second residue stream, 820, to form working gas/mixed stream 828. This stream undergoes a heat exchange against the hot exhaust stream 805 in heat exchanger 834, which produces a warmed stream 835. Warmed stream 835 is then routed to the turbo-expander, 826, to provide power to drive compressor 808. The resulting treated flue gas stream 827 is released to the environment.

In this example, about 30 vol % of the exhaust stream was routed to the two-step membrane-based carbon dioxide capture step 818a-b and the remaining 70 vol % of the exhaust stream was routed to the sweep-based membrane separation step 822.

The chemical composition of the gas stream 802, which is routed back to the combustor 812, was then calculated. The results of this calculation are shown in Table 10.

TABLE 10

| | Air (801) | Gas to Combustor (802) | Exhaust Gas (805) | Compressed/ Condensed Exhaust Stream (821) | Sweep-based Membrane Residue Treated Flue Gas (824) | First Membrane Permeate Stream (819) | $CO_2$ Conc. Stream (831) |
|---|---|---|---|---|---|---|---|
| Parameter | | | | | | | |
| Total Flow (kg/h) | 7,280 | 9,695 | 10,776 | 6,994 | 4,579 | 886 | 887 |
| Temperature (° C.) | 30 | 51 | 150 | 60 | 30.0 | 60 | 234 |
| Pressure (bar) | 1.0 | 1.0 | 1.0 | 5.0 | 5.0 | 0.2 | 1.0 |
| Component (vol %) | | | | | | | |
| Methane | 0.0 | 0.0 | 0.0 | 0.0 | 0.0 | 0.0 | 0.0 |
| Oxygen | 21.0 | 16.6 | 2.2 | 2.5 | 3.8 | 1.5 | 1.5 |
| Nitrogen | 79.0 | 69.2 | 65.7 | 74.6 | 92.3 | 23.3 | 23.3 |
| Carbon Dioxide | 0.0 | 12.8 | 18.4 | 20.9 | 3.8 | 67.0 | 67.0 |
| Water | 0.0 | 1.4 | 13.7 | 2.0 | 0.1 | 8.2 | 8.2 |

| | First Membrane Residue Stream (832) | Second Membrane Residue Stream (833) | Second Membrane Residue Stream (820) | Working Gas/Mixed Gas Stream (828) | Released Treated Flue Gas (827) |
|---|---|---|---|---|---|
| Parameter | | | | | |
| Total Flow (kg/h) | 2,110 | 715 | 1,395 | 5,974 | 5,974 |
| Temperature (° C.) | 59 | 60 | 59 | 37 | 12 |
| Pressure (bar) | 5.0 | 1.0 | 5.0 | 5.0 | 1.0 |
| Component (vol %) | | | | | |
| Methane | 0.0 | 0.0 | 0.0 | 0.0 | 0.0 |
| Oxygen | 2.9 | 3.9 | 2.4 | 3.4 | 3.4 |
| Nitrogen | 91.1 | 81.6 | 95.6 | 93.1 | 93.1 |
| Carbon Dioxide | 6.0 | 14.4 | 2.0 | 3.4 | 3.4 |
| Water | 0.0 | 0.1 | 0.0 | 0.1 | 0.1 |

The carbon dioxide-rich stream 819 from the membrane-based carbon dioxide capture step 818 contains about 67% of carbon dioxide (about 73 vol % on a dry basis). The stream 802 that is routed back to the combustor contains relatively high concentrations of both carbon dioxide and oxygen, at 12.8 and 16.6 vol %, respectively. The flue gas 827 that is released to the environment—which is a combination of streams 820 and 824—contains 3.4 vol % carbon dioxide.

The total process uses about 450 KW or about 20% of the power produced by the engine. The system captures about 70% of the carbon dioxide produced by the plant.

We claim:

1. A process for controlling carbon dioxide exhaust from a combustion process, comprising:
   (a) combusting a mixture comprising a fuel and air, oxygen-enriched air, or oxygen in a combustion apparatus, thereby creating an exhaust stream comprising carbon dioxide and nitrogen;
   (b) routing the exhaust stream to a compression apparatus to compress the exhaust stream, thereby producing a compressed stream;
   (c) separating a first portion of the compressed stream in a carbon dioxide capture unit adapted to selectively remove carbon dioxide, thereby producing a carbon dioxide-enriched stream and a carbon dioxide-depleted off-gas stream;
   (d) providing a membrane having a feed side and a permeate side, and being selectively permeable to carbon dioxide over the nitrogen and to carbon dioxide over oxygen;
   (e) passing a second portion of the compressed stream across the feed side;
   (f) passing air, oxygen-enriched air, or oxygen as a sweep stream across the permeate side;
   (g) withdrawing from the feed side a carbon dioxide-depleted residue stream;
   (h) withdrawing from the permeate side a permeate stream comprising oxygen and carbon dioxide;
   (i) passing the permeate stream to step (a) as at least part of the air, oxygen-enriched air, or oxygen used in step (a); and
   (j) routing the carbon dioxide-depleted off-gas stream from step (c) and the carbon dioxide-depleted residue stream from step (g) as a part of a working gas stream to an expander unit, and operating the expander unit, thereby generating power and producing a vent stream.

2. The process of claim 1, wherein the combustion apparatus is selected from the group consisting of a boiler, a furnace, an oven, a gas turbine, and a gas-powered or a diesel-powered engine.

3. The process of claim 2, wherein the combustion apparatus is a gas-powered or a diesel-powered engine.

4. The process of claim 1, wherein the exhaust stream comprises at least 15 vol % $CO_2$.

5. The process of claim 1, wherein the first portion of the compressed stream comprises between about 10 vol % and about 66 vol % of the compressed stream.

6. The process of claim 5, wherein the first portion of the compressed stream comprises between about 20 vol % and about 50 vol % of the compressed stream.

7. The process of claim 6, wherein the first portion of the compressed stream comprises between about 25 vol % and about 35 vol % of the compressed stream.

8. The process of claim 1, wherein the carbon dioxide capture unit comprises at least one process selected from the group consisting of absorption, adsorption, liquefaction and membrane separation.

9. The process of claim 8, wherein the carbon dioxide capture step comprises amine scrubbing.

10. The process of claim 8, wherein the carbon dioxide capture step comprises membrane separation.

11. The process of claim 10, wherein the carbon dioxide capture step comprises two or more membrane separation steps.

12. The process of claim 1, wherein the exhaust stream is compressed to a pressure of up to about 5 bar in step (b).

13. The process of claim 1, wherein the sweep stream follows a sweep flow direction across the permeate side, the second portion of the compressed stream follows a feed flow direction across the feed side, and the sweep flow direction is substantially countercurrent to the feed flow direction.

14. The process of claim 1, wherein the membrane exhibits a carbon dioxide permeance of at least 500 gpu under process operating conditions.

15. The process of claim 1, wherein the membrane exhibits a selectivity in favor of carbon dioxide over nitrogen of at least 10 under process operating conditions.

16. The process of claim 1, wherein the vent stream comprises 5 vol % carbon dioxide or less.

17. The process of claim 1, wherein the expander unit is a turbo expander mechanically linked to the compression apparatus.

18. The process of claim 1, further comprising the step of routing the exhaust stream from step (a) to a condensation unit, thereby producing a water stream, prior to step (b).

19. The process of claims 1 or 18, further comprising the step of routing the compressed stream from step (b) to a condensation unit or a second condensation unit, respectively, thereby producing a water or second water stream, prior to steps (c) and (e).

20. The process of claim 11, wherein a permeate stream from a second or additional membrane separation step in step (c) is passed as at least part of the air, oxygen-enriched air, or oxygen used in step (a).

21. The process of claim 1, wherein the carbon dioxide-enriched stream comprises at least 60 vol % $CO_2$.

22. A process for controlling carbon dioxide exhaust from a combustion process, comprising:
    (a) combusting a mixture comprising a fuel and air, oxygen-enriched air, or oxygen in a combustion apparatus, thereby creating an exhaust stream comprising carbon dioxide and nitrogen;
    (b) routing the exhaust stream to a compression apparatus to compress the exhaust stream, thereby producing a compressed stream;
    (c) separating a first portion of the compressed stream in a carbon dioxide capture, unit adapted to selectively remove carbon dioxide, thereby producing a carbon dioxide-enriched stream and a carbon dioxide-depleted off-gas stream;
    (d) providing a membrane having a feed side and a permeate side, and being selectively permeable to carbon dioxide over nitrogen and to carbon dioxide over oxygen;
    (e) passing a second portion of the compressed stream across the feed side;
    (f) passing air, oxygen-enriched air, or oxygen as a sweep stream across the permeate side;
    (g) withdrawing from the feed side a carbon dioxide-depleted residue stream;
    (h) withdrawing from the permeate side a permeate stream comprising oxygen and carbon dioxide;
    (i) passing the permeate stream to step (a) as at least part of the air, oxygen-enriched air, or oxygen used in step (a); and
    (j) routing at least one of the carbon dioxide-depleted off-gas stream from step (c) or the carbon dioxide-depleted residue stream from step (g) as a part of a working gas stream to an expander unit, and operating the expander unit, thereby generating power and producing a vent stream,
    wherein the exhaust gas from the combustion apparatus is cooled prior to compression by heat exchange with at least a portion of the working gas stream being routed to the expander unit in step (j).

* * * * *